(12) United States Patent
Kim et al.

(10) Patent No.: US 12,425,924 B2
(45) Date of Patent: Sep. 23, 2025

(54) TECHNIQUE FOR PERFORMING LOW LATENCY COMMUNICATION IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 644 days.

(21) Appl. No.: 17/755,027

(22) PCT Filed: Oct. 19, 2020

(86) PCT No.: PCT/KR2020/014222
§ 371 (c)(1),
(2) Date: Sep. 21, 2022

(87) PCT Pub. No.: WO2021/080263
PCT Pub. Date: Apr. 29, 2021

(65) Prior Publication Data
US 2023/0022414 A1    Jan. 26, 2023

(30) Foreign Application Priority Data
Oct. 23, 2019 (KR) .................. 10-2019-0132531

(51) Int. Cl.
*H04W 28/22* (2009.01)
*H04W 28/02* (2009.01)
*H04W 74/08* (2009.01)

(52) U.S. Cl.
CPC ....... *H04W 28/22* (2013.01); *H04W 28/0268* (2013.01); *H04W 74/08* (2013.01)

(58) Field of Classification Search
CPC ..... H04W 28/02; H04W 28/16; H04W 28/18; H04W 28/22; H04W 28/24; H04W 28/26;
(Continued)

(56) References Cited

U.S. PATENT DOCUMENTS

| 8,139,537 B2 * | 3/2012 | Marks ................ H04L 5/14 370/344 |
| 2016/0135182 A1 * | 5/2016 | Jung ................ H04L 5/0064 370/336 |

(Continued)

FOREIGN PATENT DOCUMENTS

| KR | 20160056820 | 5/2016 |
| KR | 101999809 | 10/2019 |

OTHER PUBLICATIONS

PCT International Application No. PCT/KR2020/014222, International Search Report dated Jan. 20, 2021, 4 pages.
(Continued)

*Primary Examiner* — Phuc H Tran
(74) *Attorney, Agent, or Firm* — LEE, HONG, DEGERMAN, KANG & WAIMEY

(57) ABSTRACT

One embodiment according to the present specification relates to a method for performing low latency communication. A transmitting STA can transmit a low latency communication notification frame including information related to a section for low latency communication. The transmitting STA and a receiving STA can perform low latency communication in the section for low latency communication on the basis of the low latency communication notification frame. Afterward, the transmitting STA can transmit a low latency communication termination frame. The transmitting STA and the receiving STA can terminate the section for low latency communication on the basis of the low latency communication termination frame.

12 Claims, 33 Drawing Sheets

(58) Field of Classification Search
CPC ............. H04W 28/0268; H04W 74/08; H04W 72/512; H04W 84/12; H04L 1/1896; H04L 1/205; H04L 5/0023; H04L 5/0048; H04L 5/0091

See application file for complete search history.

(56) References Cited

U.S. PATENT DOCUMENTS

| | | | | |
|---|---|---|---|---|
| 2016/0234857 | A1* | 8/2016 | Chen | H04L 5/0044 |
| 2016/0295563 | A1* | 10/2016 | Bai | H04W 72/044 |
| 2018/0199288 | A1* | 7/2018 | Cho | H04W 12/08 |
| 2019/0073327 | A1* | 3/2019 | Mishra | G06F 13/28 |
| 2019/0319865 | A1* | 10/2019 | Inoue | H04L 1/0079 |
| 2020/0029350 | A1* | 1/2020 | Asterjadhi | H04W 72/543 |
| 2021/0282209 | A1* | 9/2021 | Jiang | H04W 74/0816 |
| 2022/0150761 | A1* | 5/2022 | Kim | H04W 24/10 |

OTHER PUBLICATIONS

VIVO, "PUSCH enhancements for URLLC," R1-1908160, 3GPP TSG RAN WG1 #98, Aug. 2019, 9 pages.

Nokia et al., "On PUSCH enhancements for NR URLLC," R1-1908438, 3GPP TSG RAN WG1 Meeting #98, Aug. 2019, 10 pages.

Motorola Mobility et al., "PUSCH enhancement for URLLC," R1-1909154, 3GPP TSG RAN WG1 Meeting #98, Aug. 2019, 6 pages.

* cited by examiner

FIG. 1
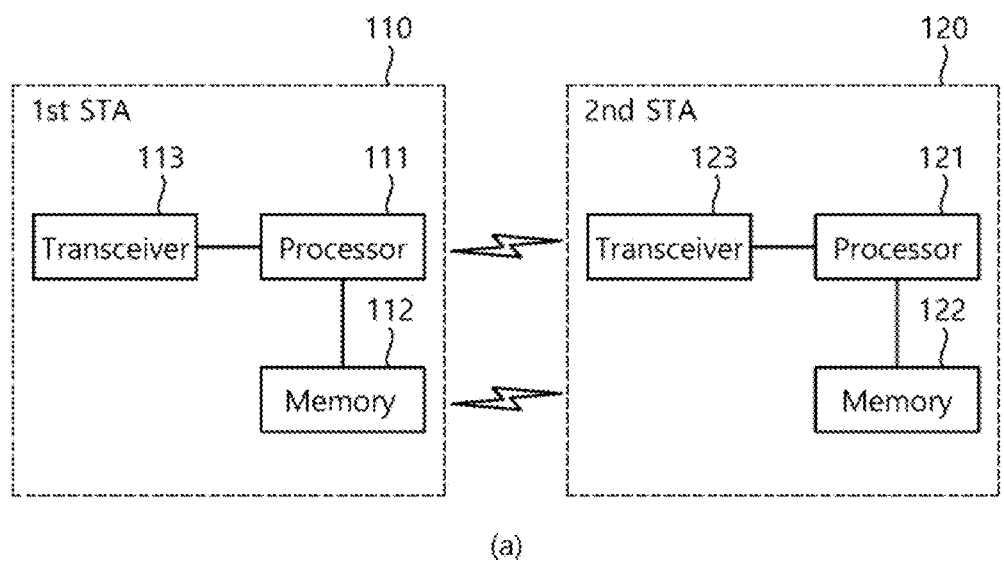
(a)
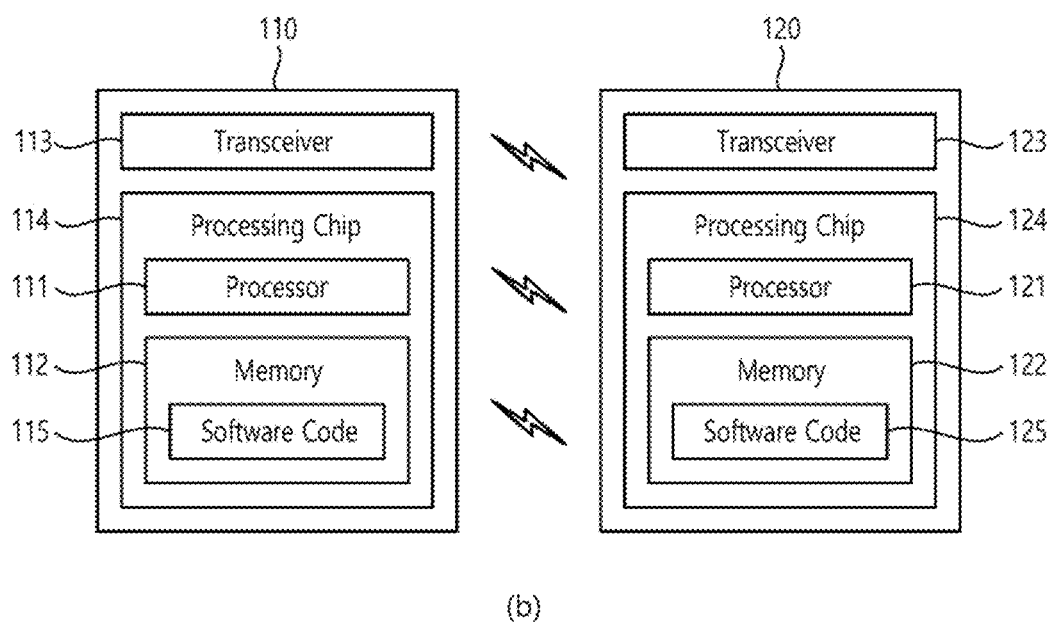
(b)

FIG. 2
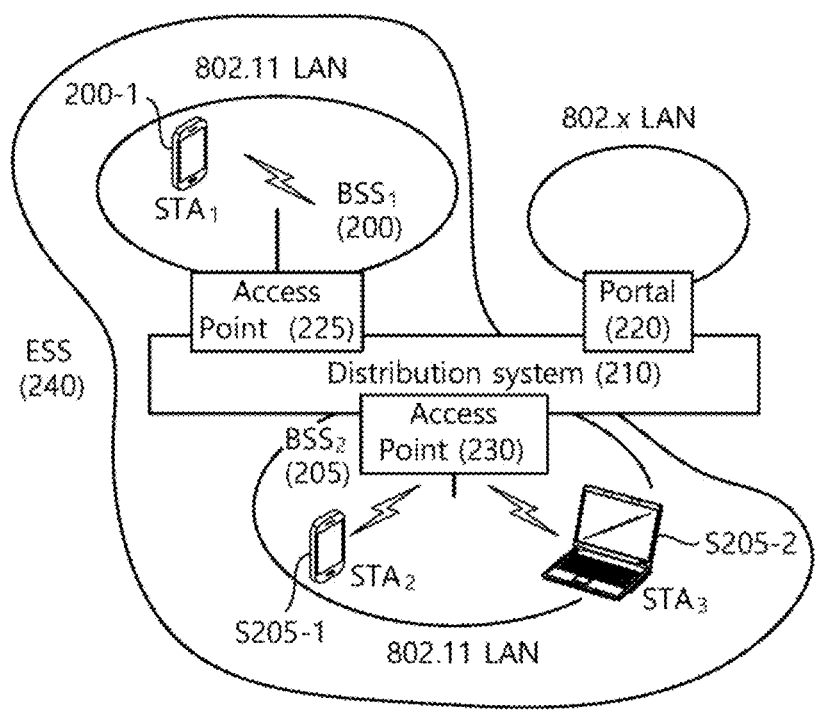
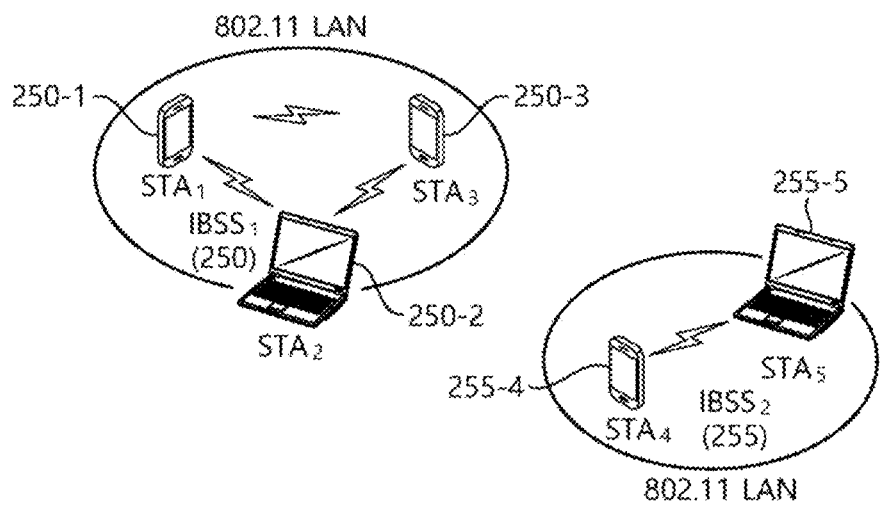

FIG. 4
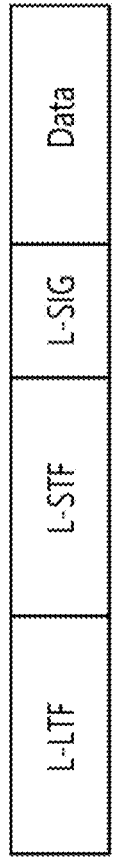
PPDU Format (IEEE 802.11a/g)
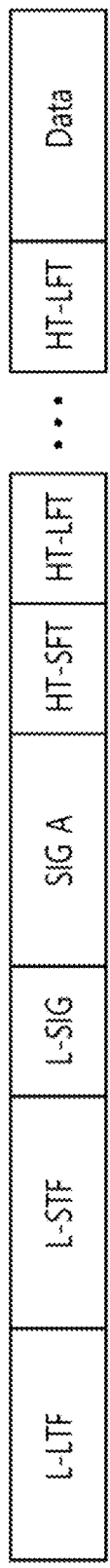
HT PPDU Format (IEEE 802.11n)
VHT PPDU Format (IEEE 802.11ac)
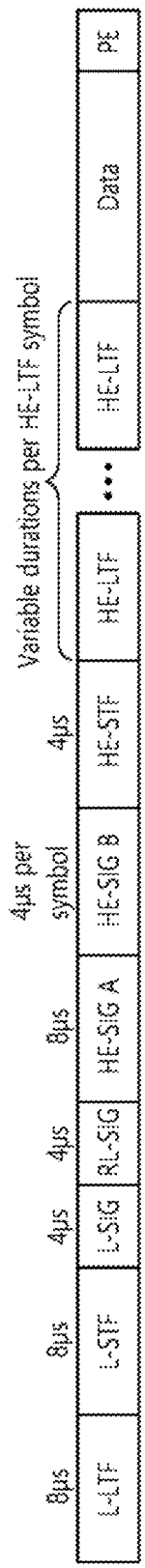

FIG. 18

| 8µs | 8µs | 4µs | 4µs | | | | |
|---|---|---|---|---|---|---|---|
| L-LTF | L-STF | L-SIG | RL-SIG | U-SIG | EHT-SIG | EHT-STF | EHT-LTF | Data |

FIG. 21

| Multi-band support (2110) | Low latency support (2120) | 16 Stream support (2130) | 320 MHz support (2140) |

| Element ID | Length (55) | TS info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets:

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

| Element ID | Length (55) | TS info | Nominal MSDU Size | Maximum MSDU Size | Minimum Service Interval | Maximum Service Interval | Inactivity Interval | Suspension Interval | Delay Jitter | Required Packet Loss |
|---|---|---|---|---|---|---|---|---|---|---|
| 1 | 1 | 3 | 2 | 2 | 4 | 4 | 4 | 4 | 2 | 2 |

2310  2320

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

TECHNIQUE FOR PERFORMING LOW LATENCY COMMUNICATION IN WIRELESS LAN SYSTEM

CROSS-REFERENCE TO RELATED APPLICATIONS

This application is the National Stage filing under 35 U.S.C. 371 of International Application No. PCT/KR2020/014222, filed on Oct. 19, 2020, which claims the benefit of earlier filing date and right of priority to Korean Application No. 10-2019-0132531, filed on Oct. 23, 2019, the contents of which are all hereby incorporated by reference herein in their entireties.

BACKGROUND

Field of the Disclosure

This specification relates to a technique for transmitting and receiving data in wireless communication, and more particularly, to a method and apparatus for performing low latency communication in a wireless LAN system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Object

Recently, as wired/wireless traffic has exploded, time delay-sensitive traffic has also increased significantly. Among the time delay-sensitive traffic, real-time audio/video transmission accounts for a large proportion. According to the proliferation of multimedia devices, the need to support time delay-sensitive traffic even in a wireless environment has increased. However, in a wireless environment rather than a wired environment, since the transmission speed is lower than that of the wired environment and there is a problem of interference from the surroundings, various methods are required to support time delay-sensitive traffic.

In particular, wireless LAN is a communication system that must compete equally in the Industrial Scientific and Medical (ISM) band without a channel monopoly by a central base station. Accordingly, it is relatively more difficult for a wireless LAN to support traffic sensitive to time delay, compared to other communications other than the wireless LAN. Accordingly, in the present specification, a technique for supporting traffic sensitive to time delay may be proposed.

Technical Solutions

According to various embodiments, a method performed by a transmitting station (STA) in a wireless local area network system comprises: transmitting a low latency communication notification frame, wherein the low latency communication notification frame includes information related to a section for low latency communication; performing the low latency communication within the section for the low latency communication; and transmitting a low latency communication termination frame, wherein the low latency communication termination frame includes information for terminating the section for the low latency communication.

Technical Effects

According to an embodiment of the present specification, a technical feature for supporting traffic sensitive to time delay may be proposed. The AP may configure a section for transmitting and receiving traffic sensitive to time delay. AP and STA may perform low latency communication within the section for transmitting and receiving traffic sensitive to time delay. Accordingly, there is an effect of efficiently transmitting and receiving traffic sensitive to time delay. In addition, since the AP manages the entire BSS and can be configured to transmit time delay-sensitive traffic easily, latency performance can be guaranteed within the entire BSS.

BRIEF DESCRIPTION OF THE DRAWINGS

FIG. 1 shows an example of a transmitting apparatus and/or receiving apparatus of the present disclosure.

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present disclosure.

FIG. 21 shows an example of the EHT Capability information element field configuration.

FIG. 22 shows an example of the TSPEC element field configuration.

FIG. 23 shows another example of the configuration of the TSPEC element field.

DETAILED DESCRIPTION

Figure 3:
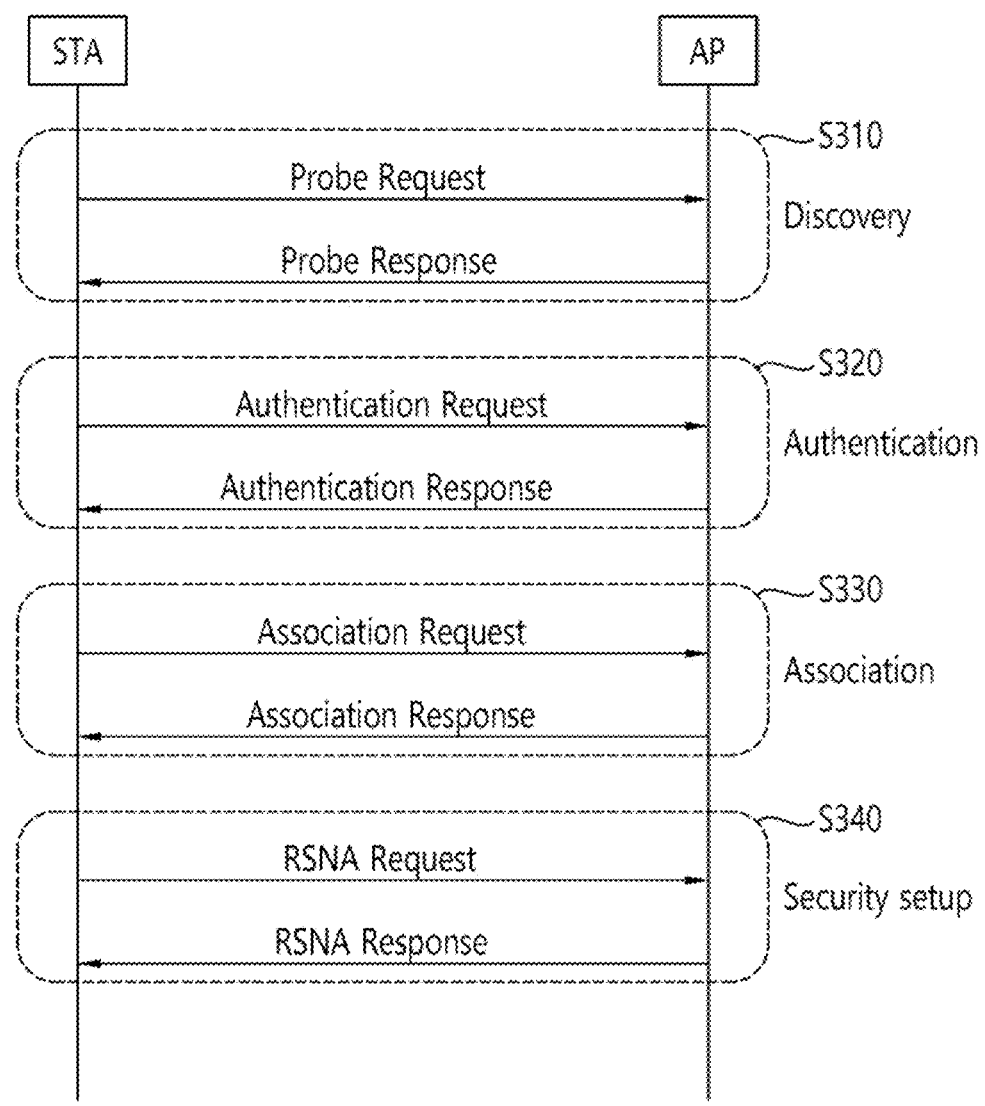
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
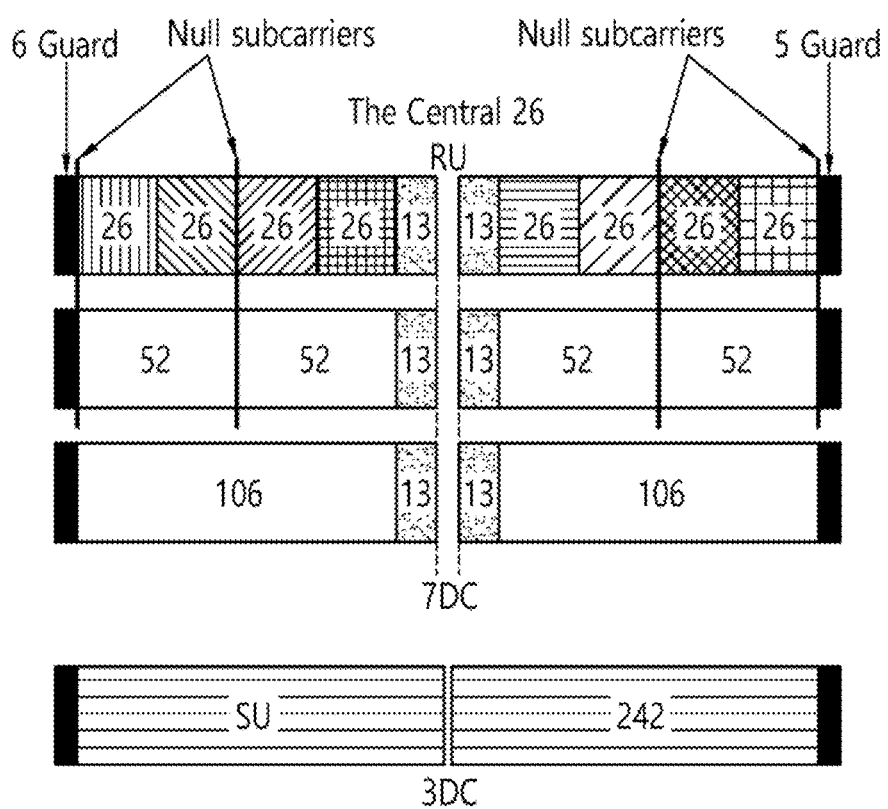
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
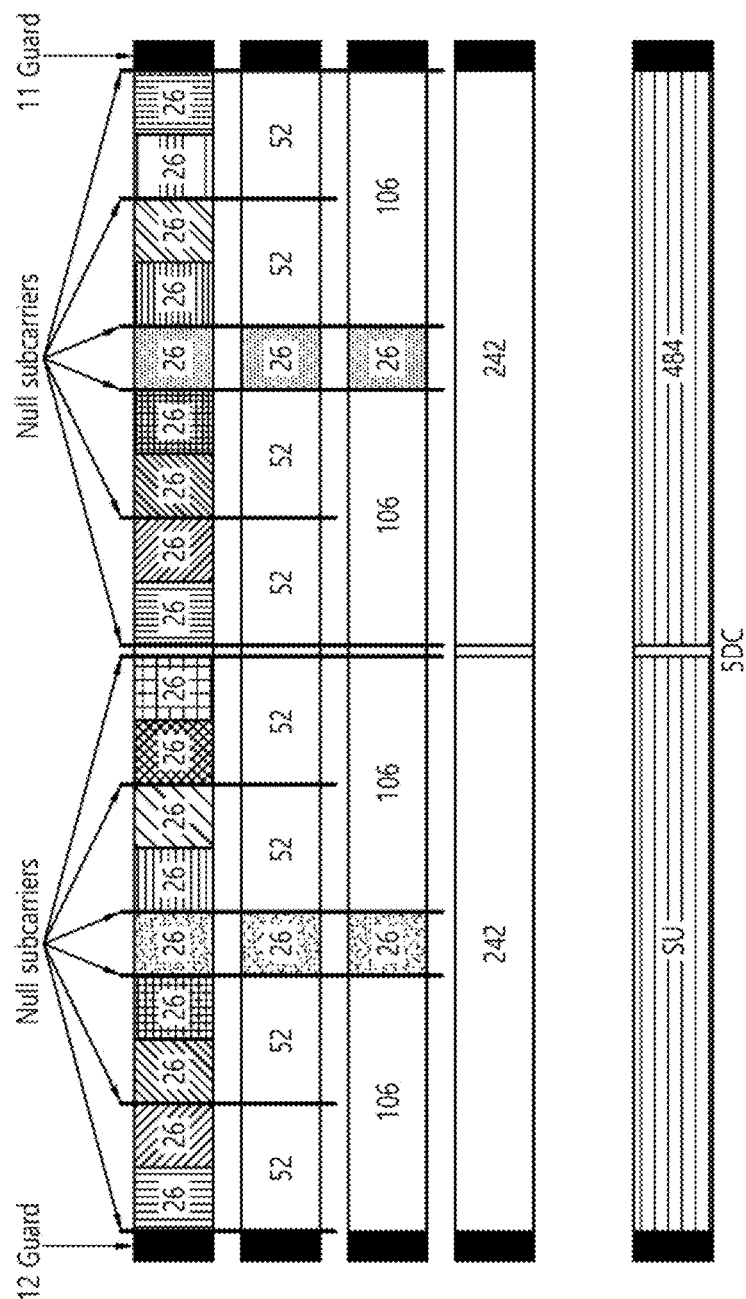
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
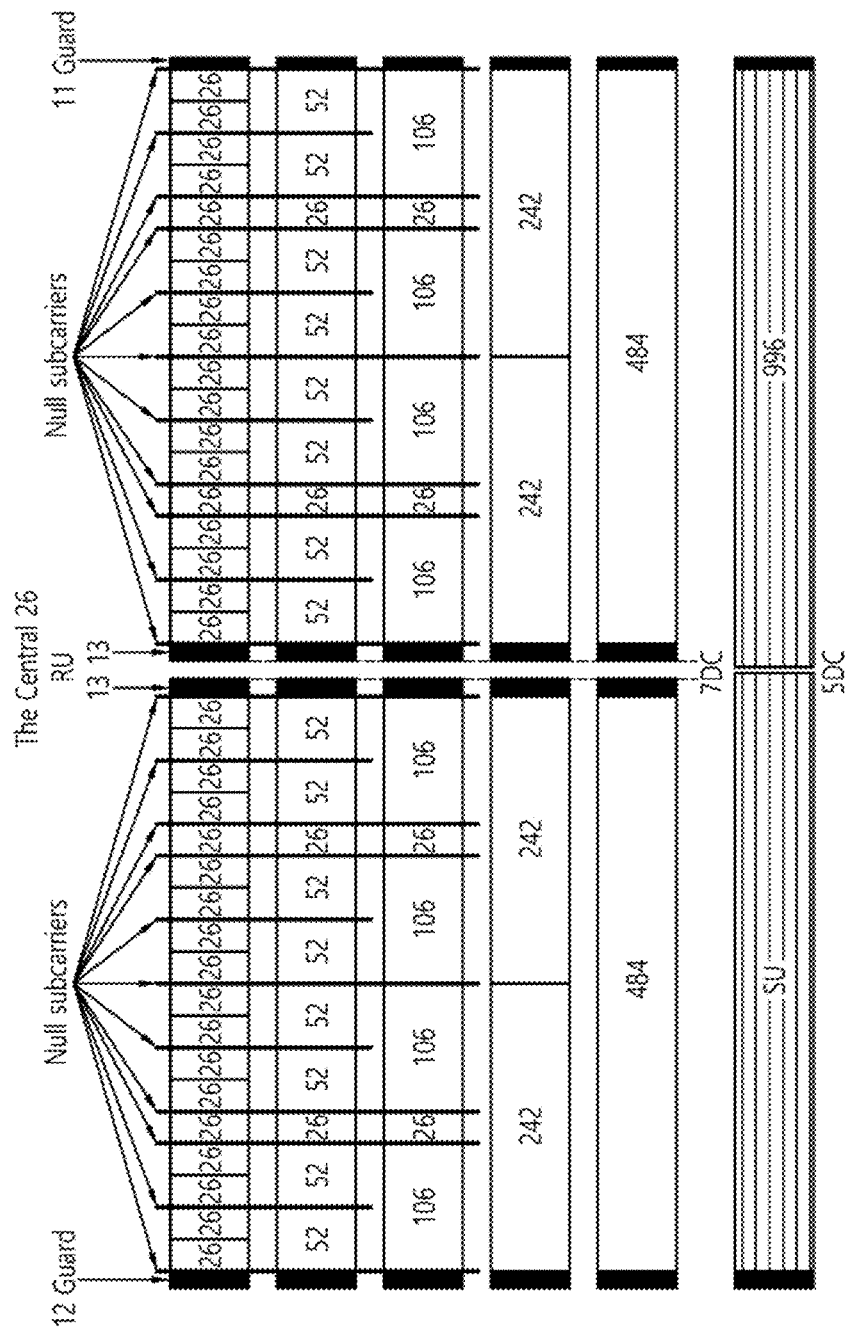
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

In addition, as illustrated, when it is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
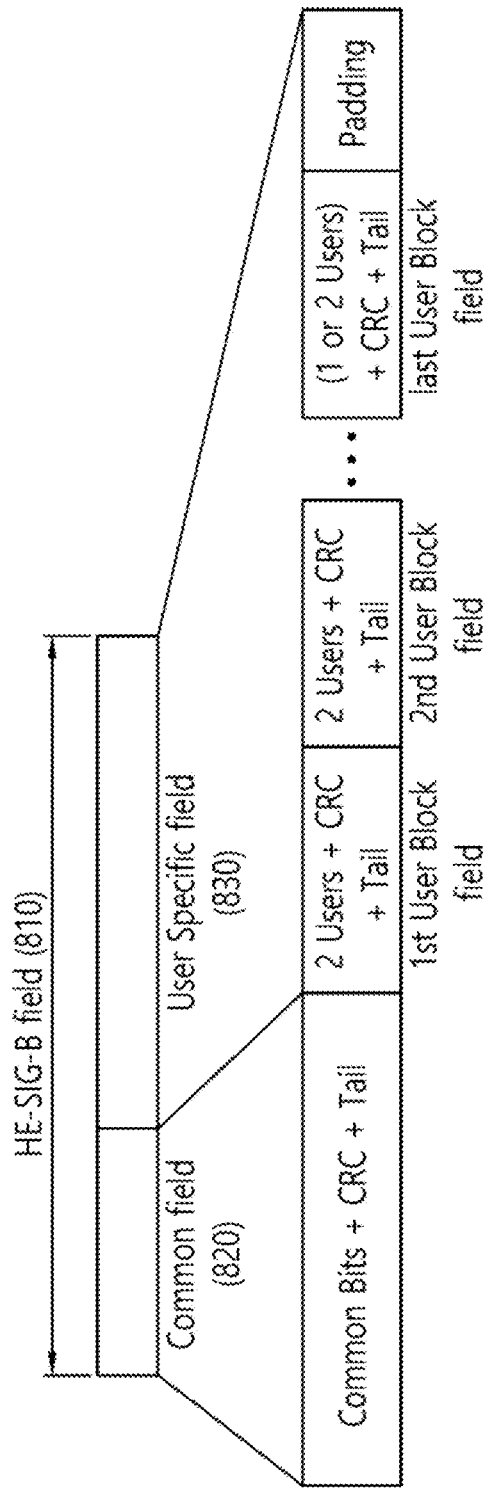
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 52 |  | 26 | 26 |  | 1 |
| 00000011 | 26 | 26 | 26 | 26 | 52 |  | 52 |  |  | 1 |
| 00000100 | 26 | 26 | 52 |  | 26 | 26 | 26 | 26 |  | 1 |
| 00000101 | 26 | 26 | 52 |  | 26 | 26 | 52 |  |  | 1 |
| 00000110 | 26 | 26 | 52 |  | 52 |  | 26 | 26 |  | 1 |
| 00000111 | 26 | 26 | 52 |  | 26 | 52 |  | 52 |  | 1 |
| 00001000 |  | 52 | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  | 106 |  |  | 26 | 26 | 26 | 26 | 26 | 8 |
| 01001$y_2y_1y_0$ |  | 106 |  |  | 26 | 26 | 26 | 52 |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
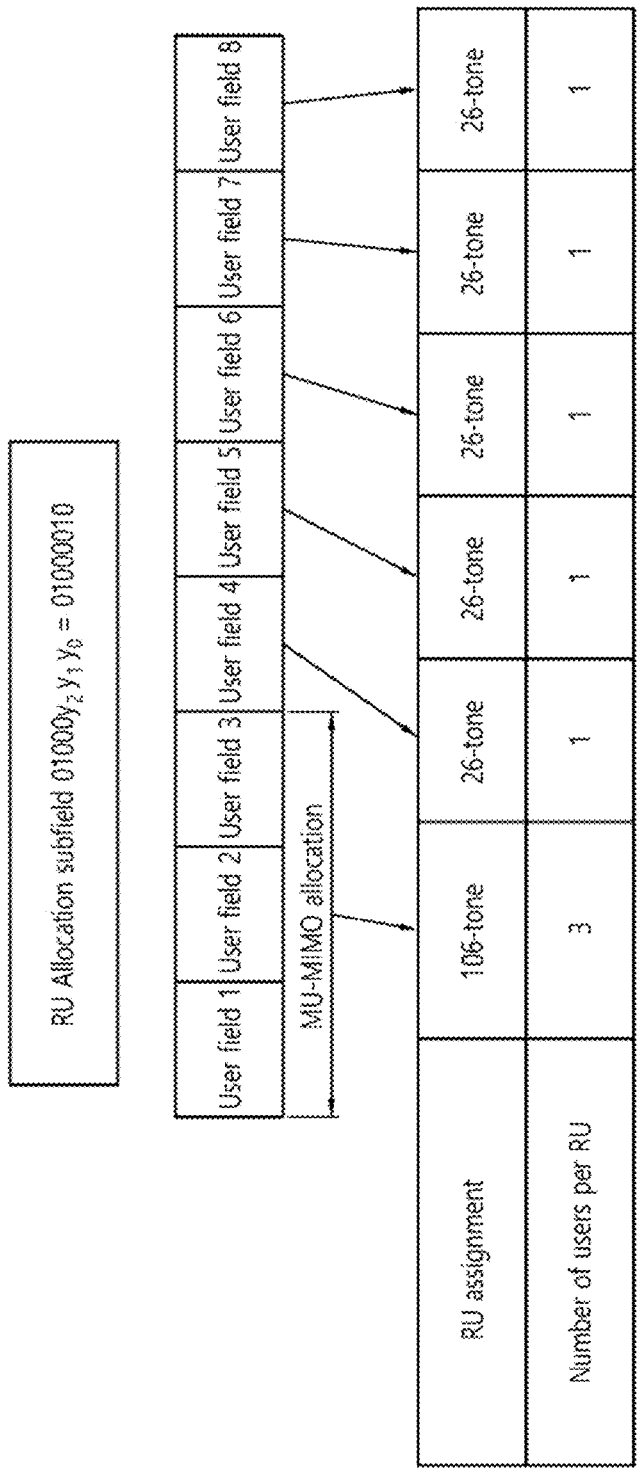
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 5 | 0000-0011 | 1-4 | 1 | 1 | | | | | | 3-6 | 13 |
| | 0100-0110 | 2-4 | 2 | 1 | | | | | | 5-7 | |
| | 0111-1000 | 4-4 | 3 | 1 | | | | | | 7-0 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
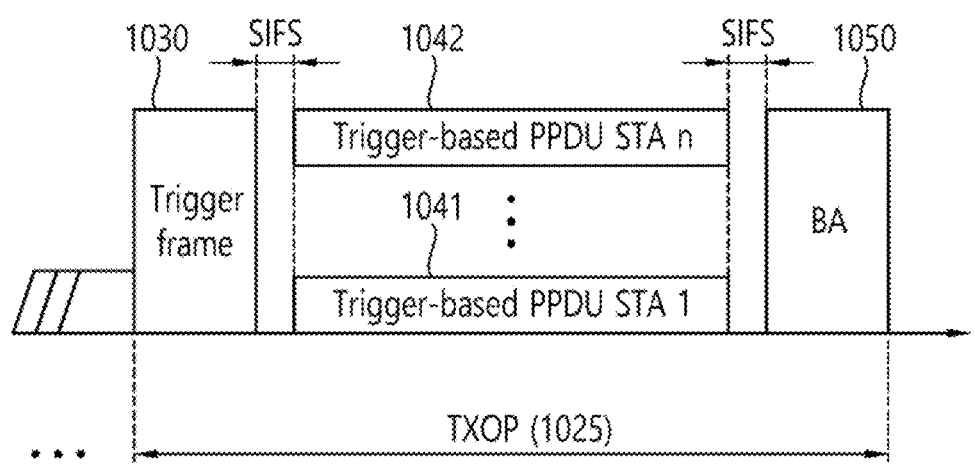
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
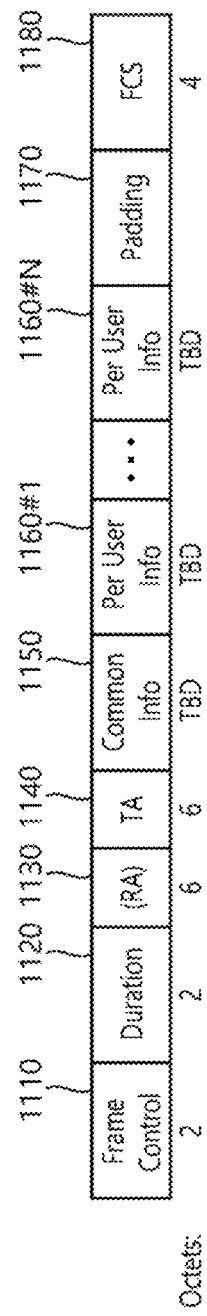
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
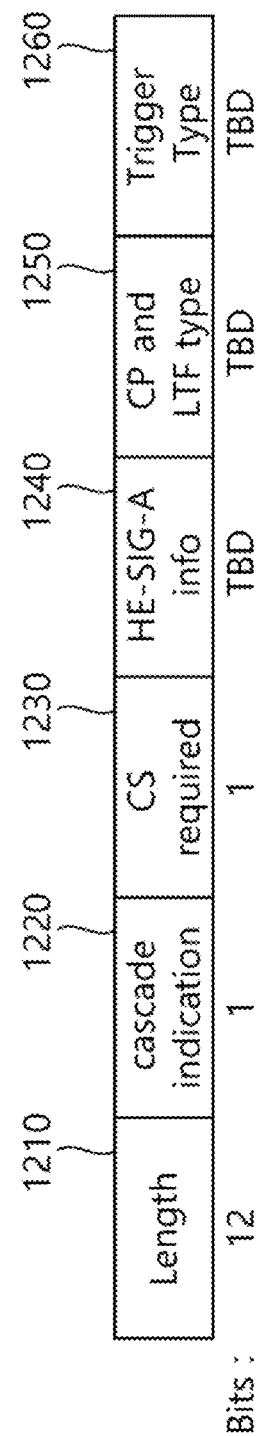
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
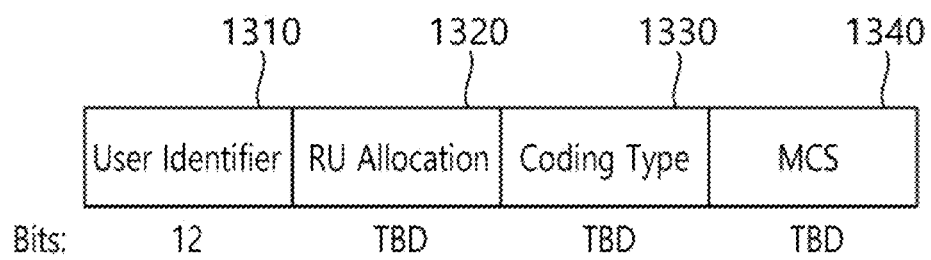
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
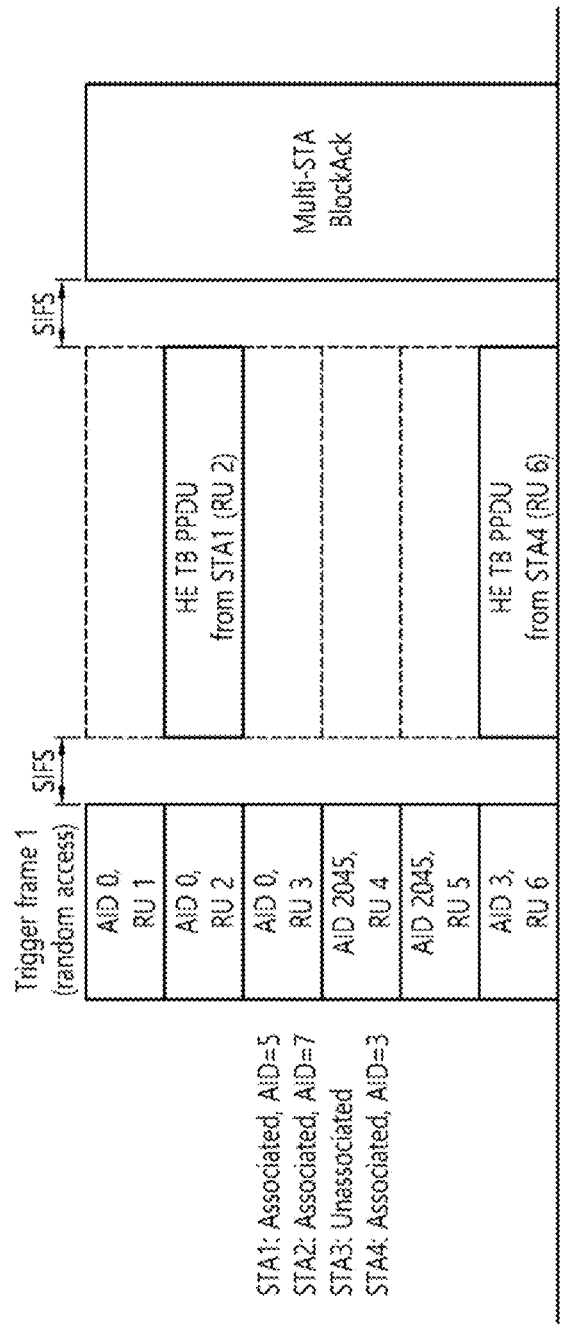
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
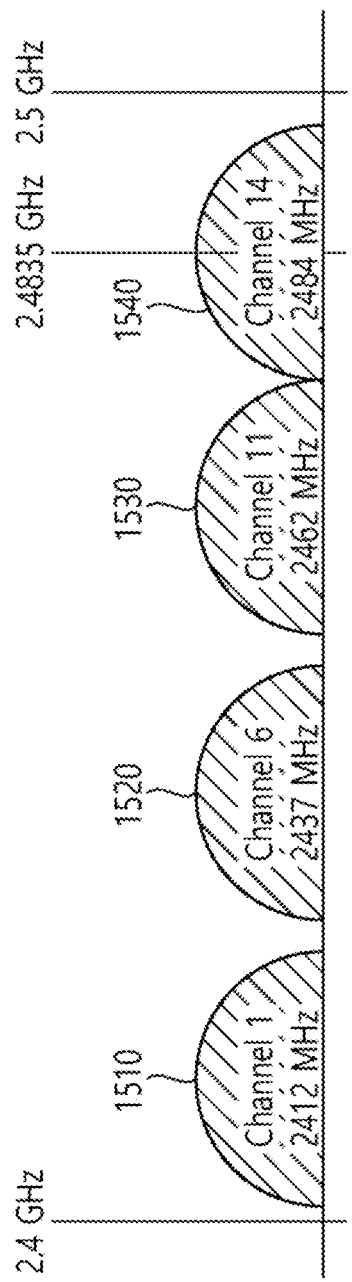
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
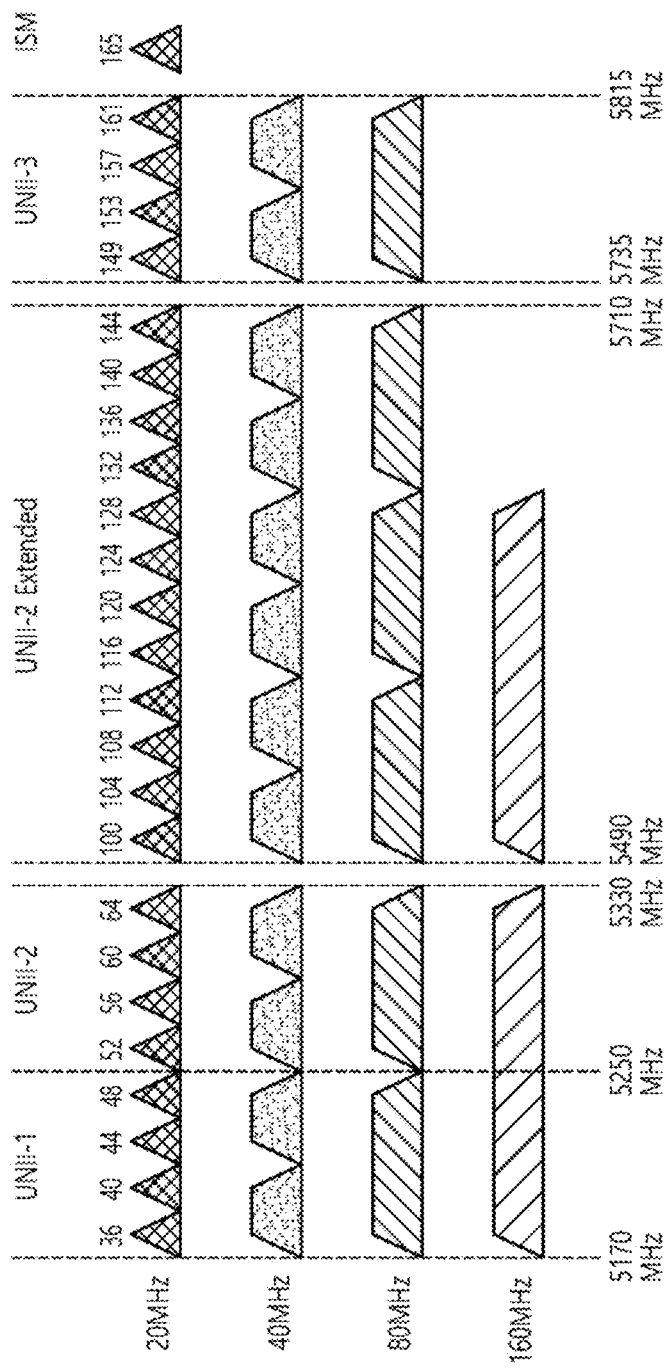
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
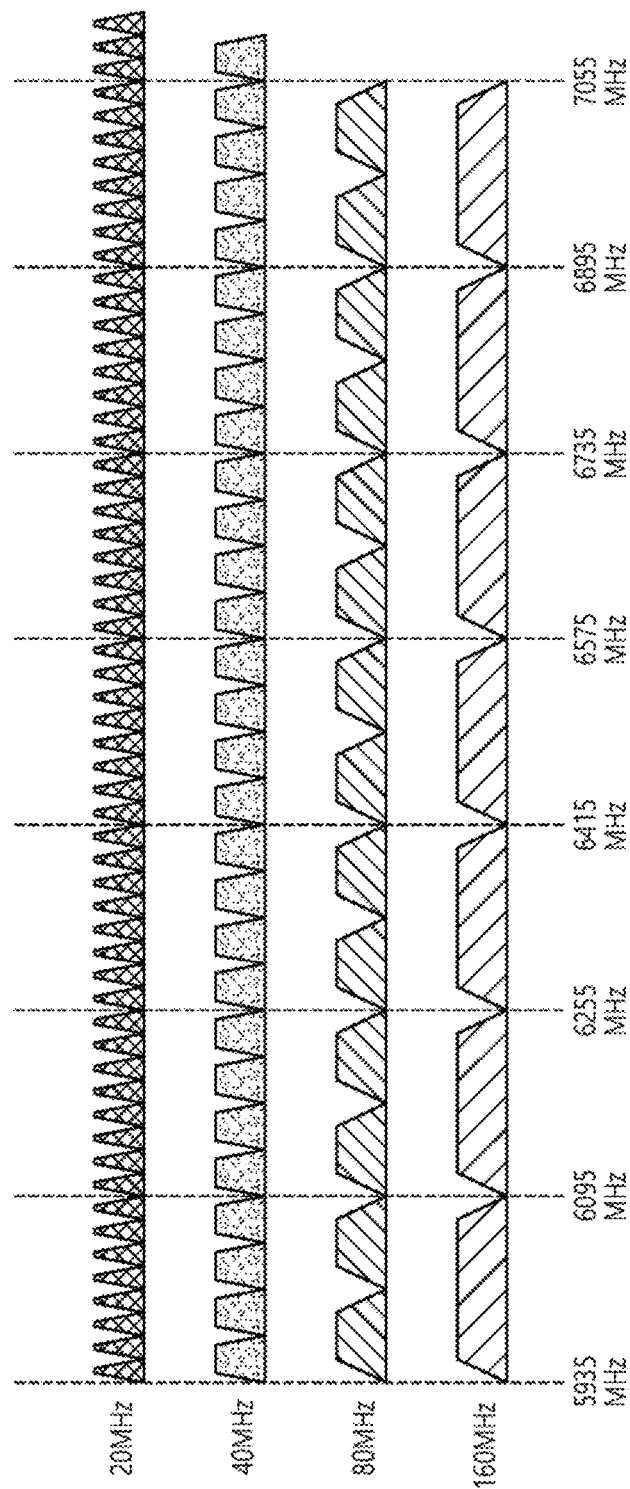
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \qquad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16 = 1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \qquad \text{<Equation 2>}$$

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \qquad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2) \qquad \text{<Equation 6>}$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \qquad \text{<Equation 7>}$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2)$$

$$\text{EHT-STF}(-248)=0$$

$$\text{EHT-STF}(248)=0 \qquad \text{<Equation 8>}$$

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \qquad \text{<Equation 9>}$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,1,-M,0,\ -M,1,-M,1,M,1,-M,0,-M,1,M,1,-M,1,-M\}*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0 \qquad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0 \qquad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
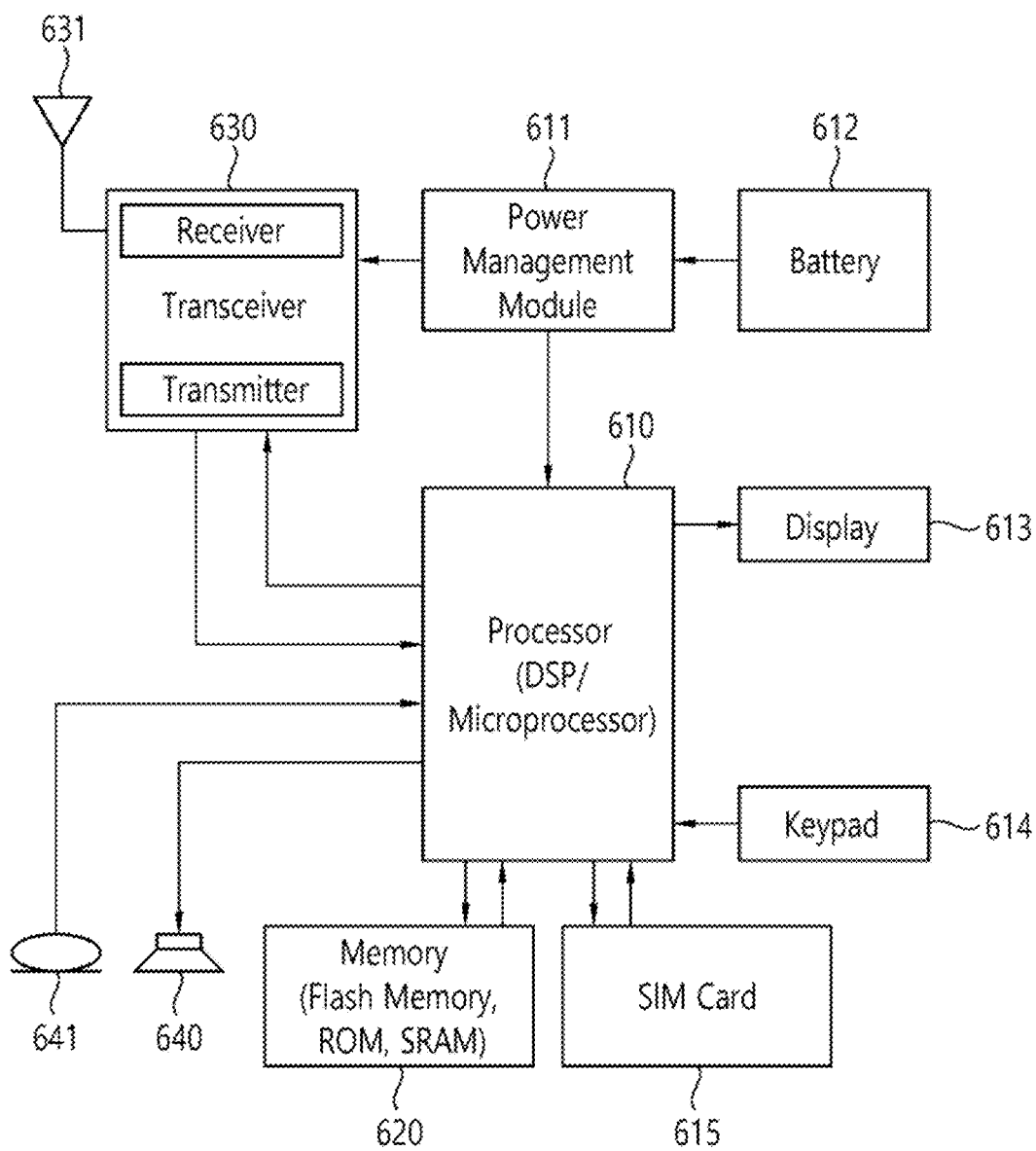
FIG. 19 illustrates an example of a modified transmission device and/or receiving device of the present disclosure.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, a method for performing low latency communication may be described. Low latency communication may refer to technology for supporting time delay-sensitive traffic (that is, low latency traffic). The time latency may mean latency defined in the IEEE 802.11ax standard.

For example, the time delay (that is, latency) may mean a time from a time point at which a frame is received by the queue of the MAC layer to a time point at which the frame is deleted from the queue of the MAC layer. Specifically, the frame may come into the queue of the MAC layer of the transmitting STA (for example, AP). Thereafter, the frame may be transmitted through the PHY layer of the transmitting STA. The frame may be successfully received by the receiving STA. The transmitting STA may receive an ACK/Block ACK frame or the like from the receiving STA. The transmitting STA may delete the frame from the queue of the MAC layer. Here, the time delay may mean a time from when a frame is received into the queue of the MAC layer until the frame is deleted from the queue of the MAC layer. Hereinafter, for convenience of description, the transmitting STA may be referred to as an access point (AP). Also, the receiving STA may be referred to as an STA.

Various technologies may be required to support time delay-sensitive traffic. For example, a method for transmitting a low latency frame, a method for low latency retransmission, a method for a low latency channel contention, or a method for low latency signaling may be required.

As an example, the method for the low latency frame transmission (or technology for low latency communication) may mean technology for reducing the time delay when transmitting a data frame. As another example, the method for low latency retransmission may refer to a technique for reducing a time delay when the data frame is retransmitted, if transmission of the data frame fails. As another example, the method for low latency channel contention may refer to a technique for reducing the time by improving the channel contention method. As another example, the method for low latency signaling may refer to a signaling technology for exchanging information related to low latency communication between the STA and the AP to perform low latency communication.

Hereinafter, the present specification may propose various technologies for supporting traffic sensitive to the above-described time delay. In addition, the traffic may include various types of traffic. For example, traffic may be divided into at least two types of traffic. As an example, the first traffic may be traffic sensitive to time delay. The second traffic may be traffic that is not sensitive to time delay. Classification of traffic according to time delay may be only one example, and classification criteria may be set in various ways. For example, the classification criteria may include at least one time delay, whether it is for machine type communication, or importance.

Hereinafter, traffic described in this specification may refer to a type of traffic different from conventional traffic. For example, traffic described below may mean traffic sensitive to time delay.

Figure 20:
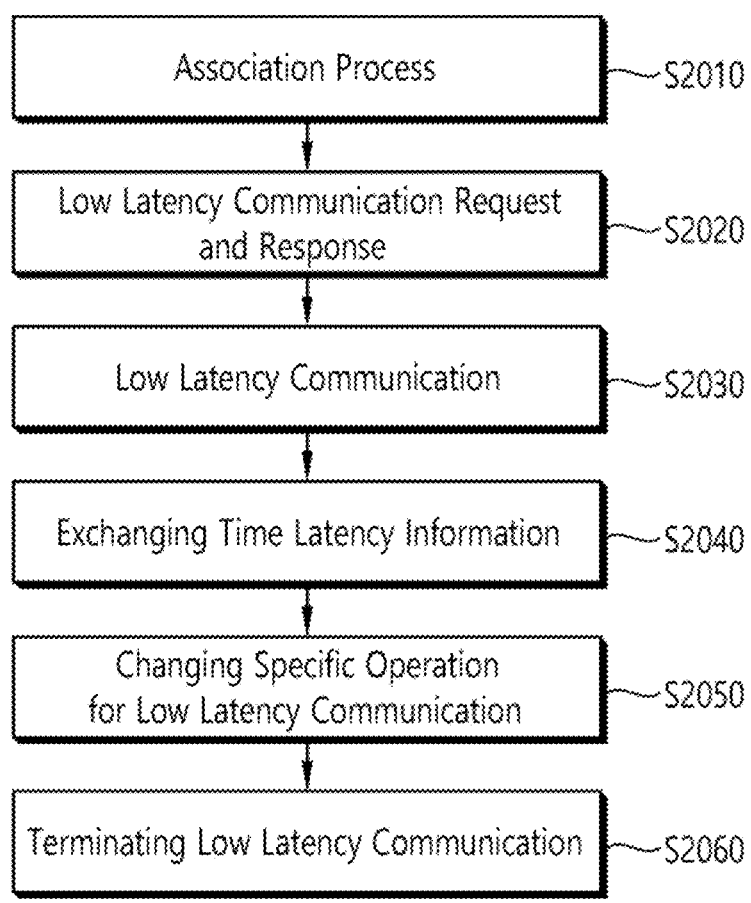
FIG. 20 is a flowchart related to an operation for performing low latency communication.

FIG. 20 is a flowchart related to an operation for performing low latency communication.

Referring to FIG. 20, the AP and the STA may perform steps S2010 to S2060. Some of the steps described above may not be essential. Accordingly, some steps may be omitted. In addition, since the order of the above-described steps is an example, the order of performing each step may vary. In addition, only one of the above-described steps may have an independent technical meaning.

In step S2010, the AP and the STA may perform an association process. Specifically, the AP and the STA may exchange information about the low-latency function. Information on the low latency function may include information on whether or not to support the low latency communication function.

In step S2020, the AP and the STA may transmit/receive a low latency communication request frame and transmit/receive a low latency communication response frame.

For example, uplink traffic may occur in the STA. The STA may request the AP to perform low latency communication based on the uplink traffic. That is, the STA may transmit a low latency communication request frame to the AP. AP may transmit a low latency communication response frame to the STA based on the low latency communication request frame.

As another example, downlink traffic may be generated from the AP. The AP may transmit information to the STA that low latency communication will be performed, based on the downlink traffic. That is, the AP may transmit a low latency communication request frame to the STA. The STA may transmit a low latency communication response frame to the AP, based on the low latency communication request frame. In the case of downlink traffic, even when the STA does not transmit a low latency communication response frame to the AP, the AP and the STA may perform low latency communication.

In step S2030, the AP and the STA may perform low latency communication. The AP and the STA may transmit and receive data frames of traffic by using low latency communication until all traffic ends.

In step S2040, the AP and the STA may exchange time latency information (or information on time latency). The AP and the STA may exchange time latency information of current traffic while low latency communication is performed. For example, the AP and the STA may exchange the current traffic time latency status. The AP and the STA may periodically exchange time latency information, alternatively, the AP and the STA may exchange time latency information whenever it is necessary.

In step S2050, the AP and the STA may change a specific operation for low latency communication. The AP and the STA may change or maintain a specific operation for low-latency communication, based on the current level (or degree) of time delay.

In step S2060, the AP and the STA may terminate the low latency communication. Based on all the traffic transmitted through the low latency communication is transmitted, the AP and the STA may request and respond to terminate the low latency communication.

Hereinafter, specific operations of the AP and the STA may be described with respect to the step of FIG. 20.

(1) Association Process for the Low-Latency Communication

The following technical features may be related to step S2010. For example, the following technical features may be used in the process of performing step S2010. Alternatively, the following technical features may be performed in steps other than step S2010.

The AP supporting the low latency communication function may include information on whether the low latency communication function is supported in the Beacon frame or the Probe response frame. Thereafter, the AP may transmit a Beacon frame or a Probe response frame. Information on whether to support the low latency communication function may be included in the EHT Capability information element field.

FIG. 21 shows an example of the EHT Capability information element field configuration.

Referring to FIG. 21, the EHT Capability information element field 2100 may include a Multi-band support field 2110, a Low Latency support field 2120, a 16 Stream support field 2130, or a 320 MHz support field 2140. The EHT Capability information element field 2100 may include capability information for main technologies applied in EHT. The specific field name of the detailed field included in the EHT Capability information element field 2100 may be changed.

For example, the Low Latency support field 2120 may include capability information for technology related to low latency communication of the STA or AP. As an example, the STA may transmit a frame (or a PPDU) including the EHT Capability information element field 2100 to the AP. The STA may transmit information that it can support low latency communication to the AP through the EHT Capability information element field 2100. In addition, the AP may also transmit information to the STA that it can support low latency communication through the EHT Capability information element field 2100 to the STA.

(2) Low-Latency Communication Request and Response Process

The following technical features may be related to step S2020. For example, the following technical features may be used in the process of performing step S2020. Alternatively, the following technical features may be performed in steps other than step S2020.

When traffic (for example, traffic sensitive to time delay) occurs, the STA and the AP may exchange information about the traffic. For example, the STA and the AP may exchange information on the traffic through a Traffic Specification (TSPEC) element field. In addition, the STA and the AP may exchange information about the traffic, and may exchange information related to low-latency communication technology together.

FIG. 22 shows an example of the TSPEC element field configuration.

Referring to FIG. 22, at least one field among subfields of the TSPEC element field 2200 may be used to exchange information about traffic. For example, the TSPEC element field 2200 may include a plurality of subfields for information about traffic. A field related to a time delay, among a plurality of subfields for the information on the traffic, may be a Delay Bound field. The Delay Bound field may include information about an allowable maximum time delay value. Additionally, the Delay Bound field may further include information on average Delay or worst-case Delay.

According to an embodiment, information about traffic may be included in a field other than the Delay Bound field. For example, the TS Info field may include information about traffic. As an example, 1 bit of the Traffic Stream (TS) Info field may include information about traffic.

According to an embodiment, a Mean Delay field may be additionally defined in addition to the Delay Bound field. The Mean Delay field may include information on both the maximum allowable time delay value and the average time delay value.

According to an embodiment, when transmitting and receiving traffic sensitive to time delay, it is important to consider the jitter value of the time delay. Therefore, in FIG. 23, a method for adding a field including information on a time delay jitter value to the TSPEC element field may be proposed. Additionally, a method for adding a field including packet loss requirement information to the TSPEC element field may be proposed.

FIG. 23 shows another example of the configuration of the TSPEC element field.

Referring to FIG. 23, the TSPEC element field 2300 may further include a Delay Jitter field 2310, and/or a Required Packet Loss field 2320, in addition to the TSPEC element field 2200 of FIG. 22.

Specifically, in traffic sensitive to time delay (that is, latency is important), Delay Bound information (that is, maximum allowable time delay value) of the TSPEC field 2300 may be an important indicator. In addition, for the traffic, the delay jitter value required for the traffic and the probability that a specific packet is lost after the maximum allowable time delay value may be important performance indicators. Accordingly, the Delay Jitter value and Required Packet Loss value of the traffic could be added to the TSPEC element field 2310. That is, the Delay Jitter field 2310 may include information about a Delay Jitter value.

The Required Packet Loss field 2320 may include information about a Required Packet Loss value. In other words, the Required Packet Loss field 2320 may include information on the probability that a specific packet is lost after the maximum allowable time delay value has passed.

Hereinafter, an example in which an STA and an AP exchange information about traffic may be described. For example, the STA may transmit a low latency communication request frame. AP may transmit a low-latency communication response frame.

The low latency communication request frame may include the first information for performing low latency communication. The first information may include at least one of information for requesting a parameter for low delay communication and information about traffic. The low latency communication response frame may include second information for performing low latency communication. The second information may include information about the parameters for low latency communication. Thereafter, the STA and AP may perform low latency communication based on the first information and the second information.

The operation of exchanging information on the above-described traffic and performing low latency communication may be described with reference to FIG. 24.

Figure 24:
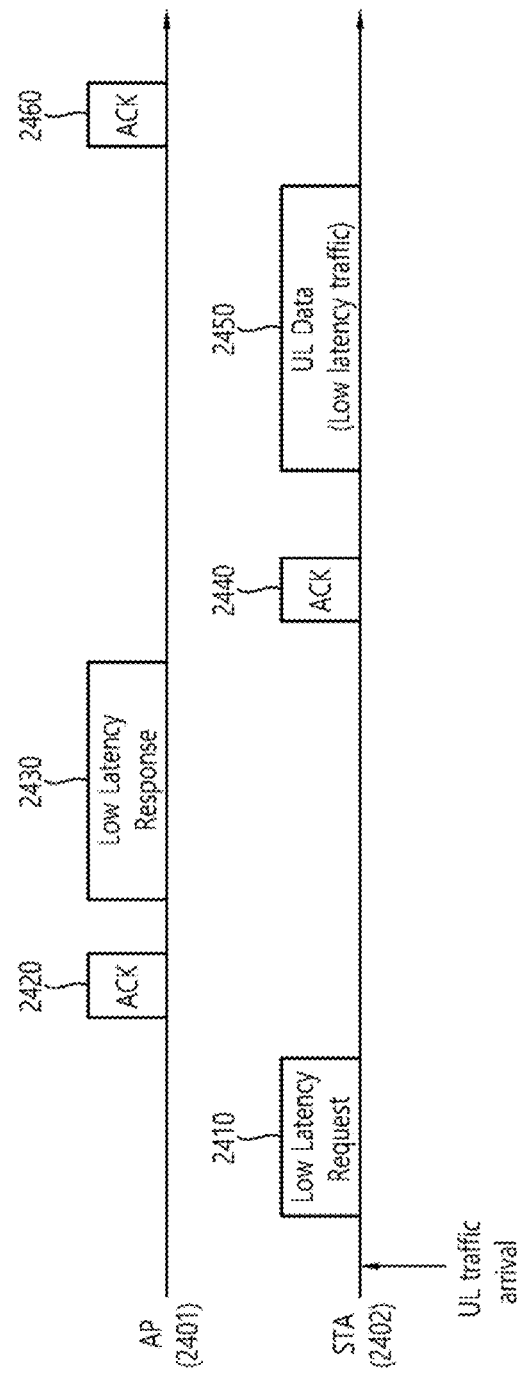
FIG. 24 shows an example of a low latency communication request and response process.

FIG. 24 shows an example of a low latency communication request and response process.

Referring to FIG. 24, after the AP 2401 and the STA 2402 exchange information on whether to support a low-latency communication function, low-latency traffic may occur. FIG. 24 shows an embodiment when uplink traffic occurs. Even when downlink traffic occurs, the AP 2401 and the STA 2402 may operate similarly.

According to an embodiment, uplink traffic may be generated/arrived at the STA 2402. Thereafter, the STA 2402 may request low-latency communication through the Low Latency Request frame 2410 including information about traffic. The AP 2401 may receive a Low Latency Request frame 2410 from the STA 2402. The AP 2401 may transmit an ACK frame 2420 to the STA 2402 in response to the Low Latency Request frame 2410.

The AP 2401 may transmit, to the STA 2402, a Low Latency Response frame 2430 including information about low-latency communication to be operated by the STA 2402. The STA 2402 may receive a Low Latency Response frame 2430. The STA 2402 may transmit an ACK frame 2440 to the AP 2401 in response to the Low Latency Response frame 2430.

The AP 2401 and the STA 2402 may perform low-latency communication based on the Low Latency Request frame 2410 and the Low Latency Response frame 2430. According to an embodiment, when downlink traffic occurs, the AP 2401 may transmit a Low Latency Request frame 2410 to the STA 2430. However, the transmission of the Low Latency Response frame 2430 from the STA 2402 may be omitted.

Hereinafter, examples of information included in the Low Latency Request frame 2410 or the Low Latency Response frame 2430 may be described. Based on the uplink traffic and the downlink traffic, information transmitted by the AP 2401 and the STA 2402 may be configured differently.

1) Example of Information Included in the Low Latency Request Frame 2410 or the Low Latency Response Frame 2430, when Uplink Traffic Occurs i) Information transmitted by the STA 2402 to the AP 2401 (at least one of the following examples may be included).

Uplink traffic information: For example, the uplink traffic information may include specific information on uplink traffic, such as a maximum allowable time delay (average or worst-case) value, a maximum allowable delay jitter value, a minimum required throughput value, or an average packet size.

Request of operation parameter value for low latency communication: For example, the STA 2402 may request, to the AP 2401, EDCA parameters (for example, CWmin, CWmax, AIFSn, etc.) to use or UL OFDMA resource allocation request information.

Time delay status report-related information: For example, the receiving side of uplink traffic may be the AP 2401. The AP 2401 may have to report the time delay status to the STA 2402. Accordingly, the STA 2402 may transmit information on the period or the condition for the time delay reporting to the AP 2401.

ii) Information transmitted from the AP 2401 to the STA 2402 (at least one of the following examples may be included).

Operational parameter value for low latency communication: For example, the AP 2401 may transmit an EDCA parameter (for example, CWmin, CWmax, AIFSn, etc.) to be used by the STA 2402 when transmitting traffic to the STA 2402, or UL OFDMA resource allocation schedule information, and the like.

Parameters related to time delay status report: For example, the AP 2401 may determine a period or a condition for time delay reporting, and then transmit it to the STA 2402.

2) Example of Information Included in the Low Latency Request Frame 2410 or the Low Latency Response Frame 2430 when Downlink Traffic Occurs i) Information transmitted by the STA 2402 to the AP 2401 (at least one of the following examples may be included).

Downlink traffic information: For example, downlink traffic information may include specific information on downlink traffic, such as a maximum allowable time delay (average or worst-case) value, a maximum allowable delay jitter value, a minimum required throughput value, and/or an average packet size.

Parameter information related to time delay status report: For example, for downlink traffic, the receiving side may be the STA 2402. The STA 2402 may have to report the time delay status to AP 2401. Accordingly, the AP 2401 may transmit information on a period or a condition for time delay reporting to the STA 2402.

After exchanging the above-described information for the traffic and low latency communication, the AP 2401 and the STA 2402 may perform low latency communication only for the traffic.

(3) Low-Latency Communication Process

The following technical features may be related to step S2030. For example, the following technical features may be used in the process of performing step S2030. Alternatively, the following technical features may be performed in steps other than step S2030.

1) The Method for Low-Latency Communication by STA and AP

Selection of Modulation Coding Scheme (MCS): A method for selecting MCS could be variously configured. However, in most cases, MCS may be selected to maximize throughput. However, MCS for maximizing throughput and MCS for minimizing time delay may be different. Therefore, when transmitting traffic sensitive to time delay, an MCS that minimizes time delay needs to be selected. If the MCS is set to the highest while keeping the Packet Error Rate (PER) close to 0%, the time delay can be minimized.

Broadband transmission: In the case of using a wideband, there is an effect of reducing the transmission time. Therefore, the broadband transmission has the effect of reducing the time delay of the traffic. Therefore, when transmitting traffic sensitive to time delay, the STA or AP could minimize the time delay by using the widest possible bandwidth.

For example, both the STA and the AP may use a first MCS selection scheme for traffic sensitive to time delay (that is, low-latency traffic) and a second MCS selection scheme for normal traffic. The first MCS selection scheme and the second MCS selection scheme may be negotiated or selected through S2010 and/or S2020.

Additionally or alternatively, both the STA and the AP may distinguish and use a first band transmission scheme for low-latency traffic and a second band transmission scheme for normal traffic. The first band transmission scheme and the second band transmission scheme may be negotiated or selected through S2010 and/or S2020.

2) The Method for Low-Latency Communication by STA
Use of appropriate EDCA parameters: STAs can adjust their priorities in channel contention with other STAs by adjusting EDCA parameters (CWmin, CWmax, AIFSn, etc.). The STA may transmit the traffic earlier than other STAs by adjusting the EDCA parameter as the traffic is sensitive to the time delay.

UL OFDMA resource allocation: Based on the characteristics of the traffic, the AP may properly allocate the UL OFDMA resource to the STA. The AP can reduce the time delay of the corresponding traffic, through the UL OFDMA resource allocation process. According to an embodiment, the STA may request allocation of a UL OFDMA resource to the AP based on the characteristics of traffic to be transmitted.

For example, the STA may distinguish and use a first EDCA parameter for time delay-sensitive traffic (that is, low-latency traffic) and a second EDCA parameter for normal traffic. The first EDCA parameter and the second EDCA parameter may be negotiated or selected through S2010 and/or S2020.

Additionally or alternatively, the STA may distinguish and use a first UL OFDMA resource allocation scheme for low-latency traffic and a second UL OFDMA resource allocation scheme for normal traffic. The first UL OFDMA resource allocation scheme and the second UL OFDMA resource allocation scheme may be negotiated or selected through S2010 and/or S2020.

3) The Method for Low-Latency Communication by AP
DL OFDMA resource allocation: The AP could reduce the time delay by allocating the DL OFDMA resource of the traffic, based on the time delay.

For example, the AP may distinguish and use a first DL OFDMA resource allocation scheme for time delay-sensitive traffic (that is, low-latency traffic) and a second DL OFDMA resource allocation scheme for normal traffic. The first DL OFDMA resource allocation scheme and the second DL OFDMA resource allocation scheme may be negotiated or selected through S2010 and/or S2020.

(4) Time Latency Information Exchange Process
The following technical characteristics may be related to step S2040. For example, the following technical features may be used in the process of performing step S2040. Alternatively, the following technical features may be performed in steps other than step S2040.

Figure 25:
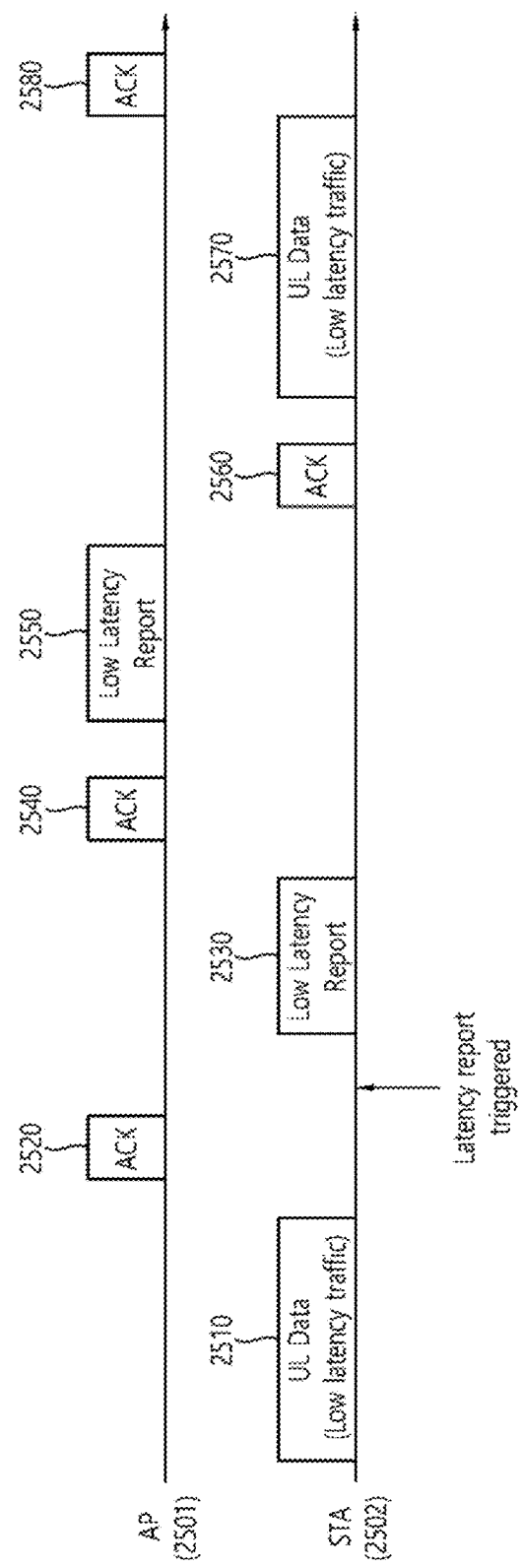
FIG. 25 shows an example of a process of exchanging time delay information.

FIG. 25 shows an example of a process of exchanging time delay information.

Referring to FIG. 25, while the STA 2502 is transmitting UL Data 2510, the AP 2501 and the STA 2502 may report a time delay status. Specifically, the STA 2502 may transmit UL Data 2510 to the AP 2501. The AP 2501 may transmit an ACK 2520 to the STA 2502 in response to the UL Data 2510.

After that, the AP 2501 and the STA 2502 may report on the time delay status at regular time intervals during low latency traffic transmission. In addition, the AP 2501 and the STA 2502 may report on the time delay status under certain conditions during low latency traffic transmission.

For example, the STA 2502 may transmit a Low Latency Report frame 2530 to the AP 2501. The AP 2501 may transmit an ACK 2540 to the STA 2502 in response to the Low Latency Report frame 2530. Also, the AP 2501 may transmit a Low Latency Report frame 2550 to the STA 2502. The STA 2502 may transmit an ACK 2560 to the AP 2501 in response to the Low Latency Report frame 2550.

After the exchange of the Low Latency Report frame 2530 and the Low Latency Report frame 2550 is completed, the STA 2502 may transmit uplink traffic to the AP 2501 again. As an example, the STA 2502 may transmit UL Data 2570 to the AP 2501. The AP 2501 may transmit an ACK 2580 to the STA 2502 in response to the UL Data 2570.

Hereinafter, conditions for transmitting the Low Latency Report frames 2530 and 2550 and information included in the Low Latency Report frames 2530 and 2550 may be described.

The AP 2501 and the STA 2502 may transmit information about a time delay value of traffic currently being transmitted/received by the AP 2501 and the STA 2502 to each other. Information on the time delay value of the traffic and the like may be included in the aforementioned Low Latency Report frames 2530 and 2550. By exchanging information on the current situation between the transmitter/receiver of the traffic, the AP 2501 and the STA 2502 may adjust the low latency transmission method. This has the effect of further improving the performance. The time or condition for reporting the time delay status and the like, and the information to be reported may be described later.

1) Time to Report
The reporting time for the time delay status may be configured in various ways, and at least one of the following methods may be used.
i) The method for periodically reporting: The AP 2501 and the STA 2502 may report information on the current situation based on a predetermined period. Before performing low latency communication, AP 2501 and STA 2502 may exchange information about traffic and low latency transmission method. At this time, information on the reporting period may also be exchanged.
ii) The method for conditional reporting: The AP 2501 and the STA 2502 may report information on the current situation according to a pre-specified condition. Before performing low latency communication, the AP 2501 and the STA 2502 may exchange information on traffic and low latency transmission methods. At this time, information about the reporting conditions may also be exchanged. The reporting conditions may be described below. At least one of the following conditions may be used simultaneously.

When the current time delay value is greater than a specific value: The AP 2501 and the STA 2502 may report on the time delay status when the performance at the receiving end has deteriorated or is likely due to the increased time delay value.

When the traffic requirement is changed: The time delay request value of the current traffic could be changed. For example, the coding method of video or audio may be changed. AP 2501 and STA 2502 may perform adjustments to the low-latency transmission method, by reporting the variation value.

When buffering takes a long time in the upper layer or time delay traffic is not transmitted properly, the AP 2501 and the STA 2502 may inform the MAC layer of this. Thereafter, the AP 2501 and the STA 2502 may report on the time delay status. As an example, the AP 2501 and the STA 2502 may report a specific time delay value.

2) How to Report

A method of reporting the time delay status may be configured in various ways, and at least one of the following methods may be used.

i) The AP 2501 may allocate resources for reporting on the time delay status by periodically triggering it. For example, the AP 2501 may allocate a resource for reporting on the time delay status by periodically transmitting a trigger frame. In the case of UL, the STA 2502 may report on the time delay status by using the resource.

ii) The AP 2501 and the STA 2502 may report on the time delay status after channel contention by using the general EDCA. According to an embodiment, the AP 2501 and the STA 2502 may perform channel contention through the EDCA parameter for low latency communication.

2) Information to be Reported

The reported information may be configured in various ways, and at least one of the following information may be used. Hereinafter, a device that reports on the time delay status may be referred to as a transmitting side. In addition, a device receiving a report on the time delay status may be called a receiving side. For example, the transmitting side may be the AP 2501 and the receiving side may be the STA 2502. Also, for another example, the transmitting side may be the STA 2502, and the receiving side may be the AP 2501.

i) Current time delay value: The transmitting/receiving side (for example, the AP 2501 and the STA 2502) may exchange the recently measured time delay value with each other. However, when the time delay value is measured by the transmitting side and the receiving side, respectively, the values measured at the transmitting side and the receiving side may come out differently. Accordingly, the current time delay value can be exchanged by the transmitting/receiving sides. Through this, the transmitting/receiving sides can accurately determine the current situation.

The transmitting side can calculate the interval by measuring the time when a medium access control service data unit (MSDU) enters and leaves the MAC queue.

The receiving side can measure how late each frame is actually received based on the time point at which each frame should be received.

Alternatively, when the transmitting side transmits a data frame, it can periodically transmit, to the receiving side, the time when the data frame entered the MAC queue of the transmitting side. The receiving side may measure the time delay value based on the time when the data frame entered the MAC queue of the transmitting side.

ii) When exceeding the maximum allowable time delay value, a number of frames or information on a sequence of frames exceeding the maximum allowable time delay value: When the number of frames or information on a sequence of frames exceeding the maximum allowable time delay value is transmitted, the transmitting side could check which frame exceeds the maximum allowable time delay value. Accordingly, the transmitting side may perform frame retransmission to reduce the maximum allowable time delay.

iii) Time delay jitter value: Transmitting/receiving sides could exchange the recently measured time delay jitter value. When the time delay jitter value is measured by the transmitting side and the receiving side, respectively, the values measured at the transmitting side and the receiving side may come out differently. Accordingly, the time delay jitter value can be exchanged by the transmitting/receiving sides. Through this, the transmitting/receiving sides can accurately determine the current situation.

iv) If the transmitting/receiving sides periodically report the time delay value, before the transmitting/receiving sides report the time delay value, the transmitting/receiving sides may measure the time delay value of a certain period of time, and then, may report the measured time delay value.

v) If the transmitting/receiving sides report a time delay value based on a specified condition, the transmitting/receiving sides may report a time delay value that satisfies the specified condition. For example, when the time delay value exceeds a specified value, the transmitting/receiving sides may report the time delay value.

vi) Changed traffic requirement values: If the requirement value of traffic is changed, the changed requirement value may be transmitted.

3) Reporting Format

The reporting format may be configured in various ways, and reported information may be included in a MAC frame based on at least one of the following methods.

i) Reported information may be defined as an element. The reported information may be aggregated with data of traffic. Accordingly, the reported information may be transmitted in A-MPDU format together with traffic data.

ii) Some of the reported information may be included in the MAC Header. According to an embodiment, after the reported information is compressed, it may be included in the MAC Header.

4) Operation After Reporting

The operation after the report may be configured in various ways, and at least one of the following methods may be used. The following technical features may be related to step S2050 and/or step S2060. For example, the following technical features may be used in the process of performing step S2050 and/or step S2060. Alternatively, the following technical features may be performed in steps other than steps S2050 and/or S2060.

i) When the time delay value or jitter value does not satisfy the requirements of the current traffic or needs to be further reduced, the transmitting/receiving sides can change the operating parameters for low-latency communication. The transmitting/receiving sides could reduce the time delay value, by changing the operating parameters for low latency communication.

ii) Since the time delay value sufficiently satisfies the requirements of the current traffic, even if it is acceptable to further increase the time delay value, transmitting/receiving sides could change the operating parameters for low-latency communication. Therefore, the transmitting/receiving sides could increase the time delay value by changing the operating parameters for low latency communication. The method of changing the operating parameters for low latency communication has the effect of improving the performance of other STAs.

iii) If the time delay value is suitable for the requirements of the current traffic, the transmitting/receiving sides could use the current low latency operation parameter as it is. In other words, the transmitting/receiving sides may maintain the current low-latency operating parameters.

According to an embodiment, after the transmission of traffic sensitive to time delay is finished, the transmitting side may notify the receiving side that the transmission of the traffic is finished. Thereafter, the transmitting/receiving sides may terminate low latency communication. The completion of the transmission of the traffic may mean that the transmission of all the traffic is completed, not that the transmission of each traffic data is finished. For example, when the traffic is Voice over Internet Protocol (VoIP), even if there is a silent section, it could be determined that traffic transmission is finished only when the call is terminated after all the corresponding calls are finished.

In the above-described embodiment, an embodiment in which the STA and the AP mutually exchange related information for low-latency traffic transmission has been proposed. According to an embodiment, the above-described embodiment may be applied to the entire BSS. Hereinafter, for low latency traffic transmission in the entire BSS, an embodiment of mutually exchanging the related information may be described.

First, a low latency mode may be defined. The low latency mode may mean a mode in which the AP manages transmission/reception of the entire BSS for low latency traffic for a specified (or constant) time period from a specific time point. An example of the operation of the STA and the AP in the low latency mode may be described with reference to FIG. 26.

Figure 26:
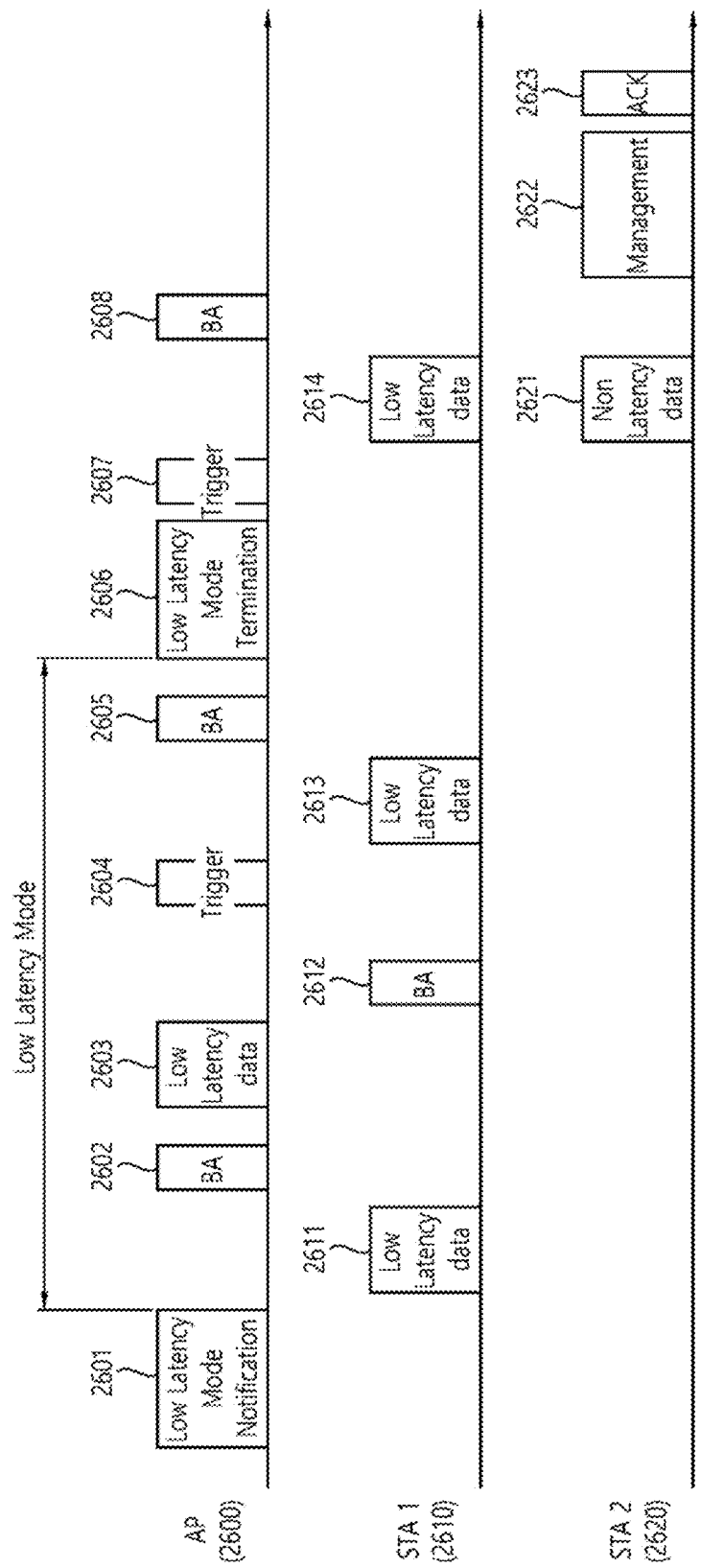
FIG. 26 shows an example of operations of STA 1, STA 2, and AP in the low latency mode.

FIG. 26 shows an example of operations of STA 1, STA 2, and AP in the low latency mode.

Referring to FIG. 26, the AP 2600 may transmit a Low Latency Mode Notification frame 2601. The Low Latency Mode Notification frame 2601 may include information about the Low Latency Mode. STA 1 2610 and STA 2 2620 may operate in the Low Latency Mode based on the Low Latency Mode Notification frame 2601. For example, STA 1 2610 and STA 2 2620 may identify a time to operate in the Low Latency Mode based on information included in the Low Latency Mode Notification frame 2601. That is, the Low Latency Mode Notification frame 2601 may include information about a time/section operating in the Low Latency Mode.

According to an embodiment, STA 1 2610 may transmit Low Latency data 2611 to the AP 2600 in the Low Latency Mode. The AP 2600 may transmit the BA 2602 in response to the Low Latency data 2611.

According to an embodiment, the AP 2600 may transmit the Low Latency data 2603 to the STA 1 2610 in the Low Latency Mode. STA 1 2610 may transmit a BA 2612 in response to the Low Latency data 2603.

According to an embodiment, the AP 2600 may transmit a Trigger frame 2604 to the STA 1 2610 in the Low Latency Mode. STA 1 2610 may transmit Low Latency data 2613 based on the Trigger frame 2604. The AP 2600 may transmit the BA 2605 in response to the Low Latency data 2613.

According to an embodiment, the AP 2600 may terminate the Low Latency Mode based on the Low Latency Mode Termination frame 2606. According to an embodiment, after the time included in the Low Latency Mode Notification frame 2601 has elapsed, the AP 2600 may terminate the Low Latency Mode without the Low Latency Mode Termination frame 2606.

In the Low Latency Mode, STA 1 2610 and STA 2 2620 may perform EDCA transmission based on the EDCA parameter (or MU EDCA parameter) indicated in the Low Latency Notification frame 2601. That is, the Low Latency Notification frame 2601 may include information about an EDCA parameter (or MU EDCA parameter).

According to an embodiment, when AIFSn of the EDCA parameter (or MU EDCA parameter) is set to a specific value (for example, "0"), it may mean that transmission of the corresponding Access Category is prohibited.

According to an embodiment, low latency traffic may be mainly transmitted in the low latency mode. STA 1 2610 may transmit low latency traffic (that is, Low Latency data 2611). However, STA 2 2620 may transmit Non-Latency data 2621 after Low Latency Mode because there is no low latency traffic. Also, the AP 2600 may prohibit transmission of the management frame in the Low Latency Mode.

For example, the AP 2600 may transmit a Trigger frame 2607. STA 1 2610 may transmit Low Latency data 2614 based on the Trigger frame 2607. That is, STA 1 2610 may transmit Low Latency traffic, even if it is not in Low Latency Mode. STA 2 2620 may not be able to transmit non-latency traffic in the low latency mode. Accordingly, STA 2 2620 may transmit Non-Latency data 2621, based on the Trigger frame 2607 received after the Low Latency Mode is terminated. The AP 2600 may transmit the BA 2608 in response to the Low Latency data 2614 and/or the Non-Latency data 2621.

For example, the AP 2600 may prohibit transmission of the Management frame in the Low Latency Mode. STA 2 2620 may not be able to transmit the Management frame 2622 in Low Latency Mode. Accordingly, STA 2 2620 may transmit the Management frame 2622 after the Low Latency Mode is terminated.

According to an embodiment, the Low Latency Notification frame 2601 may include various types of information. Hereinafter, an example of information included in the Low Latency Notification frame 2601 may be described.

i) Low Latency Traffic info: The Low Latency Notification frame 2601 may include information about conditions for traffic that can be transmitted in Low Latency Mode or Traffic ID.
  ii) (MU) EDCA parameters: The Low Latency Notification frame 2601 may include information on (MU) EDCA parameters to be applied only in Low Latency Mode. For example, when AIFSn or TXOP limit is configured to a specific value (for example, "0"), the corresponding Access Category may be configured to be impossible to transmit.
  iii) Low Latency Mode duration: The AP 2600 may transmit information on the length of a section for operating the Low Latency Mode through the Low Latency Notification frame 2601.
  iv) Permission for Management frame: The AP 2600 may inform, through the Low Latency Notification frame 2601, whether each frame of the management frame, such as a Probe Request, an Association Request, and the like, can be transmitted According to an embodiment, the BSS may support multi-link. In this case, one of the multi-link may operate in a low latency mode. For example, in the BSS operating with Link 1 and Link 2, the AP may operate by assigning Link 2 to the Low Latency Mode. When one of the multi-link operates in the Low Latency Mode, an example of a signal transmitted from the multi-link may be described with reference to FIG. 27.

Figure 27:
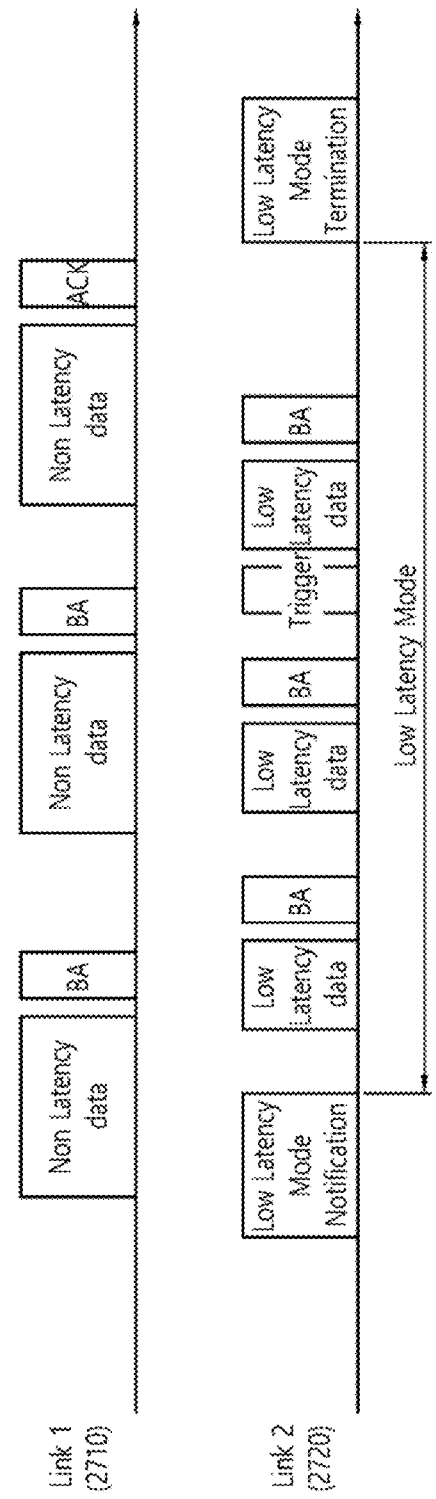
FIG. 27 shows an example of a signal transmitted in a multi-link in Low Latency Mode.

FIG. 27 shows an example of a signal transmitted in a multi-link in Low Latency Mode.

Referring to FIG. 27, the BSS may support multi-link. For example, the BSS may include an AP and a plurality of STAs. The signal shown in FIG. 27 may be transmitted/received by the AP and a plurality of STAs. For the convenience of description, a plurality of STAs may be described as a STA.

According to an embodiment, the BSS may operate in Link 1 2710 and Link 2 2720. Link 2 2720 may operate in Low Latency Mode.

For example, the AP may transmit a Low Latency Mode Notification frame through Link 2 2720. Thereafter, Link 2 2720 may operate in Low Latency Mode based on the Low Latency Mode Notification frame. Accordingly, the AP and the STA may transmit/receive Low Latency data through Link 2 2720 in the Low Latency Mode. In addition, the AP and the STA may transmit/receive non-latency data through Link 1 2710. When transmission/reception of the management frame is prohibited in the Low Latency Mode, the AP and the STA may transmit/receive the management frame through Link 1 2710.

According to an embodiment, the Low Latency Mode Notification frame may include information about a link to operate in the Low Latency Mode. Although not shown, the AP may transmit a Low Latency Mode Notification frame through Link 1 2710. The Low Latency Mode Notification frame may include information indicating that the Low Latency Mode is configured in Link 2 2720. Thereafter, the AP and the STA may transmit/receive Low Latency data through Link 2 2720. Contrary to the above example, a Low Latency Mode Notification frame may be transmitted through Link 2 2720, and a Low Latency Mode may be configured in Link 1 2710.

According to an embodiment, the AP may inform the information about the Low Latency Mode by including it in a Beacon frame. An example in which the AP transmits information on the Low Latency Mode through the Beacon frame may be described with reference to FIG. 28.

Figure 28:
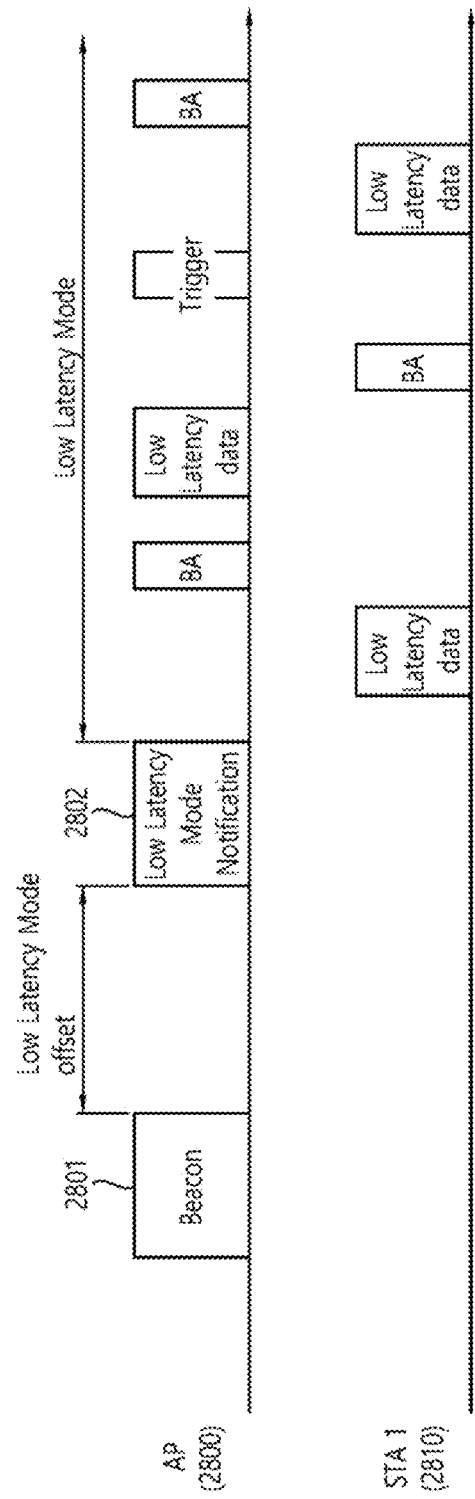
FIG. 28 shows an example of operations of STA 1 and AP in Low Latency Mode.

FIG. 28 shows an example of operations of STA 1 and AP in Low Latency Mode.

Referring to FIG. 28, the AP 2800 may transmit a beacon frame 2801. The Beacon frame 2801 may include information about the Low Latency Mode. According to an embodiment, the Beacon frame 2801 may include at least some of the information included in the Low Latency Mode Notification frame 2802 described above. Additionally, the Beacon frame 2801 may further include information about an expected time at which the Low Latency Mode Notification frame 2802 will be transmitted (Low Latency Mode offset).

For example, STA 1 2810 may receive a Beacon frame 2801. STA 1 2810 may obtain/confirm information regarding a time when the Low Latency Mode starts. Accordingly, STA 1 2810 may prepare in advance to transmit low latency traffic. Thereafter, the AP 2800 may transmit a Low Latency Mode Notification frame 2802. Based on the Low Latency Mode Notification frame 2802, a Low Latency Mode may be configured. The AP 2800 and the STA 1 2810 may transmit/receive Low Latency Data (or Low Latency Traffic) in the Low Latency Mode.

According to an embodiment, if the Low Latency Modes of each BSS overlap in an Overlapping Basic Service Set (OBSS), it may be difficult to guarantee low latency traffic performance. Accordingly, each BSS of the OBSS may allocate a Low Latency Mode so that regions do not overlap. An example in which each BSS of the OBSS allocates a Low Latency Mode may be described with reference to FIG. 29.

Figure 29:
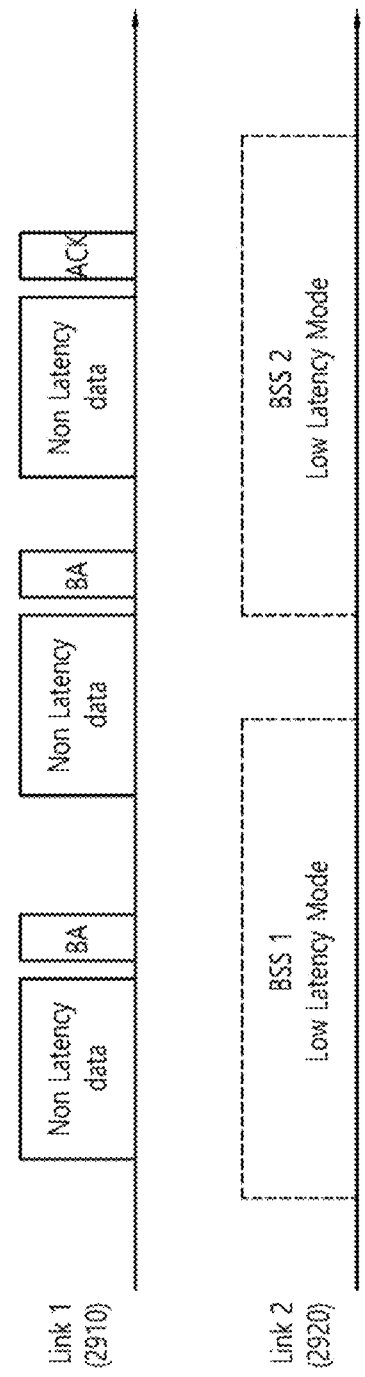
FIG. 29 shows an example in which each BSS allocates a Low Latency Mode.

FIG. 29 shows an example in which each BSS allocates a Low Latency Mode.

Referring to FIG. 29, both BSS 1 and BSS 2 may support multi-link. According to an embodiment, BSS 1 and BSS 2 may operate in Link 1 2910 and Link 2 2920. BSS 1 and BSS 2 may configure/allocate a Low Latency Mode in Link 2 2920. BSS 1 and BSS 2 may configure each Low Latency Mode so that the Low Latency Modes do not overlap each other.

Hereinafter, advantages and disadvantages obtainable when the Low Latency Mode is configured may be described.

For example, there is an effect that the performance of latency traffic is guaranteed. Since the AP manages the entire BSS and artificially creates an environment to facilitate low latency traffic transmission, latency performance of latency traffic can be guaranteed.

As another example, an operation problem may occur in an environment where OBSS is severe. In an environment in which the OBSS is severe, the above-described effect may be reduced by the frame transmitted from the OBSS even if the corresponding BSS operates in the Low Latency Mode.

Figure 30:
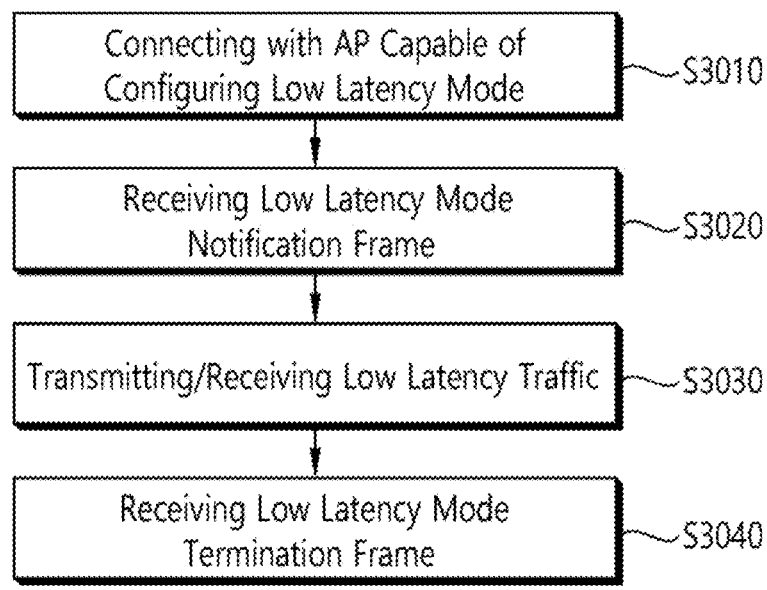
FIG. 30 is a flowchart illustrating an operation of a STA.

FIG. 30 is a flowchart illustrating an operation of a STA.

Referring to FIG. 30, in step S3010, the STA may establish a connection with an AP capable of configuring a Low Latency Mode. According to an embodiment, the AP may transmit capability information regarding the Low Latency Mode to the STA. For example, the AP may transmit capability information regarding the Low Latency Mode to the STA based on the Beacon frame. The STA can confirm that the AP can configure the Low Latency Mode.

In step S3020, the STA may receive a Low Latency Mode Notification frame from the AP. According to an embodiment, the Low Latency Mode Notification frame may include information about the Low Latency Mode.

For example, the STA may identify a duration to operate in the Low Latency Mode based on information about the Low Latency Mode.

As another example, the STA may check information about a traffic condition that can be transmitted in the Low Latency Mode or Traffic ID, based on the information on the Low Latency Mode. As an example, low latency traffic may be traffic requiring a latency smaller than a specified value. Accordingly, the STA may identify the specified value based on the information on the Low Latency Mode.

As another example, the STA may identify information on the (MU) EDCA parameters based on the information on the Low Latency Mode. In Low Latency Mode, EDCA parameters may be applied differently. As an example, in the Low Latency Mode, when AIFSn or TXOP limit is configured to a specific value (for example, "0"), the corresponding Access Category may be configured to be impossible to transmit.

As another example, the STA may identify whether a management frame can be transmitted in the Low Latency Mode based on information about the Low Latency Mode. For example, in the Low Latency Mode, transmission and reception of the Management frame may be restricted.

In step S3030, the STA may transmit and receive low latency traffic with the AP. According to an embodiment, the STA may transmit/receive Low Latency Traffic in Low Latency Mode.

For example, in the Low Latency Mode, the STA may transmit Low Latency Traffic to the AP without receiving a Trigger frame. In other words, the STA may transmit Low Latency Traffic to the AP in the Low Latency Mode, based on channel contention. As another example, the STA may transmit Low Latency Traffic to the AP in the Low Latency Mode, based on the Trigger frame.

In step S3040, the STA may receive a Low Latency Mode Termination frame. The Low Latency Mode Termination frame may include information for terminating the Low Latency Mode. The STA may terminate the Low Latency Mode based on the Low Latency Mode Termination frame.

Figure 31:
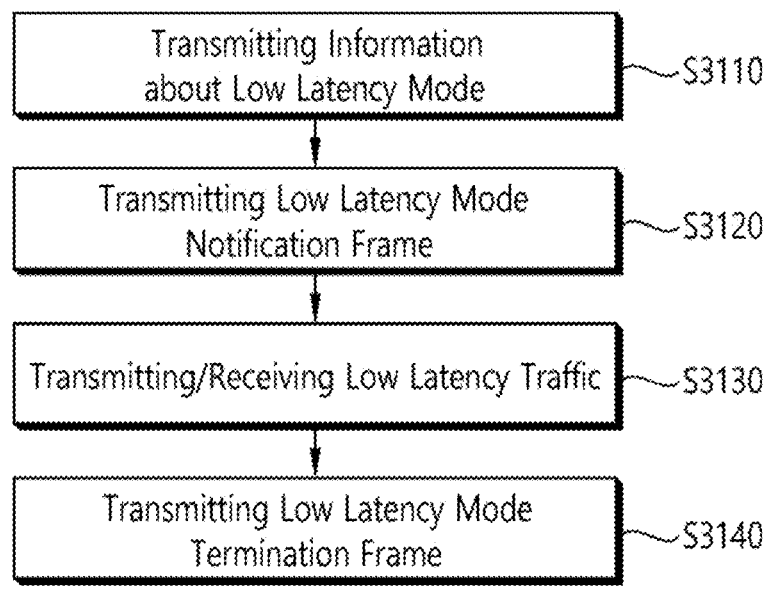
FIG. 31 is a flowchart for explaining the operation of the AP.

FIG. 31 is a flowchart for explaining the operation of the AP.

Referring to FIG. 31, in step S3110, the AP may transmit information about the Low Latency Mode. According to an embodiment, the AP may transmit information about the Low Latency Mode through the Beacon frame. In other words, the Beacon frame may include information about the Low Latency Mode.

For example, the AP may transmit capability information regarding the Low Latency Mode to the STA based on the Beacon frame. As another example, the Beacon frame may include at least some of the information included in the Low Latency Mode Notification frame. As another example, the Beacon frame may include information about an expected time (Low Latency Mode offset) at which the Low Latency Mode Notification frame will be transmitted.

In step S3120, the AP may transmit a Low Latency Mode Notification frame. The Low Latency Mode Notification frame may include information about the Low Latency Mode.

For example, the information on the Low Latency Mode may include information on the duration to operate in the Low Latency Mode.

As another example, the information on the Low Latency Mode may include information on conditions of traffic that can be transmitted in the Low Latency Mode or information on a Traffic ID. As an example, low latency traffic may be traffic requiring a latency smaller than a specified value. Accordingly, the AP may change the low latency traffic criterion by configuring the specified value.

As another example, the information about the Low Latency Mode may include information about the (MU) EDCA parameters. In Low Latency Mode, EDCA parameters may be applied differently. For example, in the Low Latency Mode, when AIFSn or TXOP limit is configured to a specific value (for example, "0"), the corresponding Access Category may be configured to be impossible to transmit.

As another example, the information on the Low Latency Mode may include information on whether a management frame can be transmitted in the Low Latency Mode. For example, in the Low Latency Mode, transmission and reception of the Management frame may be restricted.

In step S3130, the AP may transmit/receive low latency traffic to and from the STA. According to an embodiment, the AP may transmit/receive Low Latency Traffic in Low Latency Mode.

As an example, the AP may transmit a Trigger frame in Low Latency Mode. The AP may receive Low Latency Traffic from the STA based on the Trigger frame. As another example, the AP may receive Low Latency Traffic from the STA based on channel contention in the Low Latency Mode.

In step S3140, the AP may transmit a Low Latency Mode Termination frame. The Low Latency Mode Termination frame may include information for terminating the Low Latency Mode. The AP may terminate the Low Latency Mode based on the Low Latency Mode Termination frame.

Figure 32:
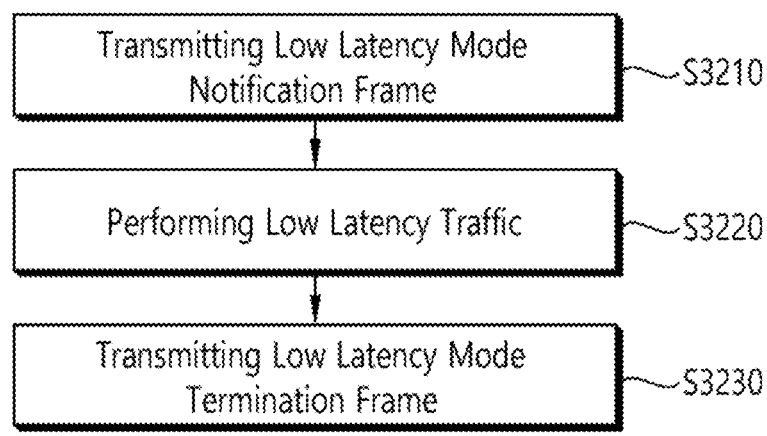
FIG. 32 is a flowchart illustrating an operation of a transmitting STA.

FIG. 32 is a flowchart illustrating an operation of a transmitting STA.

Referring to FIG. 32, in step S3210, the transmitting STA (for example, STA 110, 120) may transmit a low latency communication notification frame. According to one embodiment, the low latency communication notification frame may include a Low Latency Mode Notification frame.

According to an embodiment, the transmitting STA may determine a section for low latency communication. The section for the low latency communication may include a section for transmitting low latency data. Low latency data may include data requiring a time latency value less than or equal to a threshold value.

According to an embodiment, the low latency communication notification frame may include information about a section for low latency communication. For example, the low latency communication notification frame may include information about the start time and/or the end time of the section for low latency communication. For another example, the low latency communication notification frame may include information about the start time and/or the length of the section for low latency communication for the low latency communication section.

According to an embodiment, the low latency communication notification frame may include information about the type of data and/or the condition of data that can be communicated within the low latency communication section.

For example, the transmitting STA may configure data that can be communicated within the low latency communication section as image data. In this case, only image data can be transmitted and received within the low latency communication section.

For another example, the transmitting STA may determine a threshold value related to the time latency of the low-latency data. Since the low latency data means data requiring a time delay value less than or equal to a threshold value, the transmitting STA may change the criterion of the low latency data by changing the threshold value. As an example, if there is a lot of data buffered in the transmitting STA, the transmitting STA may change the criterion of the threshold value of low latency data. Therefore, the transmitting STA can transmit more data within the low latency communication interval.

According to an embodiment, the low latency communication notification frame may include information about a link on which low latency communication is performed. For example, the transmitting STA may operate on multiple links (or multi-link). The transmitting STA may determine at least one link for performing low latency communication among a plurality of links. In other words, the section for low latency communication may be configured in at least one link among the plurality of links.

As an example, the transmitting STA may transmit information about at least one link for performing low latency communication through a low latency communication notification frame. For example, the transmitting STA may transmit a low latency communication notification frame in the at least one link. For another example, the transmitting STA may transmit the low latency communication notification frame through another link distinct from the at least one link.

According to an embodiment, the transmitting STA may transmit a beacon frame before transmitting the low latency communication notification frame. The beacon frame may include at least some of the information included in the low latency communication notification frame. For example, the beacon frame may include information on the section for low latency communication or information on the transmission time of the low latency communication notification frame.

According to an embodiment, the transmitting STA may prohibit transmission and reception of a management frame within an interval for low latency communication. The transmitting STA may transmit, to the receiving STA, information that transmission/reception of a management frame is prohibited within a section for low-latency communication, based on the low latency communication notification frame. In other words, the section for low latency communication may include a section in which transmission and reception of a management frame are prohibited.

According to an embodiment, the transmitting STA may configure a section for low latency communication differently from the second section for low latency communication configured in the OBSS. For example, the section for the low latency communication and the second section for the low latency communication may be configured so as not to overlap with each other.

In step S3220, the transmitting STA may perform low latency communication within the section for low latency communication.

According to an embodiment, the transmitting STA may transmit a trigger frame within the section for low latency communication. The transmitting STA may receive low latency data from the receiving STA within the section for low latency communication, based on the trigger frame.

According to an embodiment, the transmitting STA may receive low latency data from the receiving STA within the section for low latency communication, based on channel contention.

According to an embodiment, the transmitting STA may not transmit/receive a management frame within a section for low latency communication. For example, when a section for low latency communication is configured in at least one link among a plurality of links, the transmitting STA may transmit/receive a management frame through another link distinct from at least one link.

According to an embodiment, the transmitting STA may transmit or receive information about the time delay within the section for low latency communication.

For example, the time latency information may include information for reporting the time delay status. For example, the information on the time delay may include at least one of information on the current time delay value, information on the number of frames exceeding the maximum allowable time delay value, sequence information exceeding the maximum allowable time delay value, or information on the jitter value.

For example, the transmitting STA may transmit or receive information about the time delay, within the section for low latency communication, based on a specified period and/or condition.

According to an embodiment, the transmitting STA may perform low latency communication through at least one link among a plurality of links.

In step S3230, the transmitting STA may transmit a low latency communication termination frame. The low latency communication termination frame may include information for terminating the section for low latency communication. According to one embodiment, the low latency communication termination frame may include a Low Latency Mode Termination frame.

Some of the steps described above may not be essential. Accordingly, some steps may be omitted. In addition, since the order of the above-described steps is an example, the order of performing each step may vary. In addition, only one of the above-described steps may have an independent technical meaning.

Figure 33:
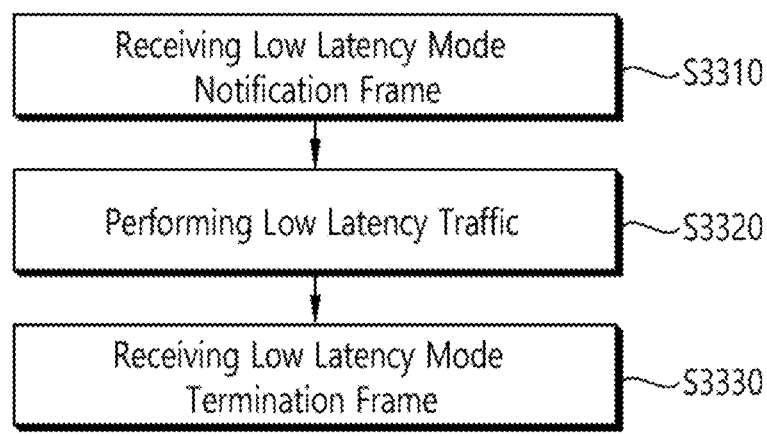
FIG. 33 is a flowchart illustrating an operation of a receiving STA.

FIG. 33 is a flowchart illustrating an operation of a receiving STA.

Referring to FIG. 33, in step S3310, the receiving STA (for example, STAs 110 and 120) may receive a low latency communication notification frame. According to one embodiment, the low latency communication notification frame may include a Low Latency Mode Notification frame.

According to an embodiment, the receiving STA may identify a section for low latency communication based on the low latency communication notification frame. The section for the low latency communication may include a section for transmitting low latency data. Low latency data may include data requiring a time latency value less than or equal to a threshold value.

According to an embodiment, the low latency communication notification frame may include information about a section for low latency communication. For example, the low latency communication notification frame may include information about the start time and/or the end time of the section for low latency communication. For another example, the low latency communication notification frame may include information about the start time and/or the length of the section for low latency communication for the low latency communication section.

According to an embodiment, the low latency communication notification frame may include information about the type of data and/or the condition of data that can be communicated within the low latency communication section.

For example, the receiving STA may identify that communicable data within the low latency communication section is configured as image data, based on the low latency communication notification frame. In this case, only image data can be transmitted and received within the low latency communication section.

For another example, based on the low latency communication notification frame, the receiving STA may identify the threshold value related to the time latency of the low latency data. Since the low latency data means data requiring a time delay value less than or equal to a threshold value, the receiving STA may change the criterion of the low latency data based on the threshold value. For example, when the threshold value of the delay data is lowered, the receiving STA may transmit more data within the low latency communication section.

According to an embodiment, the low latency communication notification frame may include information about a link on which low latency communication is performed. For example, the receiving STA may operate on a plurality of links (or multi-link). The receiving STA may check at least one link through which low latency communication is performed, based on the low latency communication notification frame. In other words, the section for low latency communication may be configured in at least one link among a plurality of links.

As an example, the receiving STA may receive information about at least one link for performing low latency communication through a low latency communication notification frame. For example, the receiving STA may receive a low latency communication notification frame through the at least one link. That is, the receiving STA may receive information about at least one link for performing low latency communication through the at least one link. For another example, the receiving STA may receive a low latency communication notification frame through another link distinct from at least one link. That is, the receiving STA may receive information about the at least one link for performing low latency communication through another link distinct from the at least one link.

According to an embodiment, the receiving STA may receive a beacon frame before transmitting the low latency communication notification frame. The beacon frame may include at least some of the information included in the low latency communication notification frame. For example, the beacon frame may include information on the section for low latency communication or information on the transmission time of the low latency communication notification frame.

According to an embodiment, the receiving STA may receive, from the transmitting STA information informing that transmission and reception of a management frame are prohibited within a section for low-latency communication, based on the low latency communication notification frame. Based on the low latency communication notification frame, receiving STA can identify that the transmission and reception of the management frame within the section for low-latency communication is prohibited. In other words, the section for low latency communication may include a section in which transmission and reception of a management frame are prohibited.

In step S3220, the receiving STA may perform low latency communication within the section for low latency communication.

According to an embodiment, the receiving STA may receive a trigger frame within the section for low latency communication. The receiving STA may transmit low latency data to the transmitting STA within the section for low latency communication, based on the trigger frame.

According to an embodiment, the receiving STA may transmit low latency data to the transmitting STA within the section for low latency communication, based on channel contention.

According to an embodiment, the receiving STA may not transmit/receive a management frame within the section for low latency communication. For example, when a section for low latency communication is configured in at least one link among a plurality of links, the receiving STA may transmit/receive a management frame through another link distinct from at least one link.

According to an embodiment, the receiving STA may transmit or receive information about the time delay within the section for low latency communication.

For example, the time latency information may include information for reporting the time delay status. For example, the information on the time delay may include at least one of information on the current time delay value, information on the number of frames exceeding the maximum allowable time delay value, sequence information exceeding the maximum allowable time delay value, or information on the jitter value.

For example, the receiving STA may transmit or receive information about the time delay, within the section for low latency communication, based on a specified period and/or condition.

According to an embodiment, the receiving STA may perform low latency communication through at least one link among a plurality of links.

In step S3330, the receiving STA may receive a low latency communication termination frame. The low latency communication termination frame may include information for terminating the section for low latency communication. According to one embodiment, the low latency communication termination frame may include a Low Latency Mode Termination frame.

According to an embodiment, the receiving STA may terminate a section for low latency communication on the basis of the low latency communication termination frame.

According to an embodiment, the receiving STA may terminate the low latency communication, even if the Low Latency Mode Termination frame is not received after the termination time of the section for low latency communication.

Some of the steps described above may not be essential. Accordingly, some steps may be omitted. In addition, since the order of the above-described steps is an example, the order of performing each step may vary. In addition, only one of the above-described steps may have an independent technical meaning.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the device of the present specification may be configured to transmit a low latency communication notification frame, wherein the low latency communication notification frame includes information related to a section for low latency communication, perform the low latency communication within the section for the low latency communication, and transmit a low latency communication termination frame, wherein the low latency communication termination frame includes information for terminating the section for the low latency communication.

The technical features of the present disclosure may be implemented based on a computer readable medium (CRM). For example, a CRM proposed by the present disclosure may store instructions which perform operations including the steps of transmitting a low latency communication notification frame, wherein the low latency communication notification frame includes information related to a section for low latency communication, performing the low latency communication within the section for the low latency communication, and transmitting a low latency communication termination frame, wherein the low latency communication termination frame includes information for terminating the section for the low latency communication. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method comprising:
    transmitting, by a station (STA), a first Physical Protocol Data Unit (PPDU) including a first management frame, wherein the first management frame includes information related to a duration for low latency communication;
    transmitting, by the STA, a trigger frame soliciting a trigger based (TB) PPDU with the duration;
    receiving, by the STA, the TB PPDU including low latency data based on the trigger frame, wherein the TB PPDU includes a legacy signal (L-SIG) field, a repeated L-SIG (RL-SIG) field being contiguous to the L-SIG field, and a first signal field being contiguous to the RL-SIG field,
    wherein the L-SIG field includes a length field, and a value of the length field is set to satisfy a condition that a remainder is zero (0) when the value of the length field is divided by three (3),
    wherein the first SIG field includes first information related to a PPDU type, second information related to an identifier of a basic service set (BSS), third information indicating duration information related to a transmission opportunity (TXOP), fourth information related to whether the PPDU is sent in uplink (UL) or in downlink (DL), fifth information related to a bandwidth, and sixth information having a length of 3 bits and indicating a physical (PHY) version of the PPDU; and
    transmitting, by the STA, a second PPDU including a second management frame, wherein the second management frame includes information for terminating the duration.

2. The method of claim 1,
    wherein the low latency data includes data requiring a time latency value less than or equal to a threshold value.

3. The method of claim 1,
    wherein the low latency data is received, based on channel contention, within the duration for the low latency communication, wherein the low latency data includes data requiring a time latency value less than or equal to a threshold value.

4. The method of claim 1, wherein the duration is configured in at least one link among a plurality of links.

5. A method, comprising:
receiving, by a station (STA), a first Physical Protocol Data Unit (PPDU) including a first management frame, wherein the first management frame includes information related to a duration for low latency communication;
receiving, by the STA, a trigger frame soliciting a trigger based (TB) PPDU with the duration;
transmitting, by the STA, the TB PPDU including low latency data based on the trigger frame, wherein the TB PPDU includes a legacy signal (L-SIG) field, a repeated L-SIG (RL-SIG) field being contiguous to the L-SIG field, and a first signal field being contiguous to the RL-SIG field,
wherein the L-SIG field includes a length field, and a value of the length field is set to satisfy a condition that a remainder is zero (0) when the value of the length field is divided by three (3),
wherein the first SIG field includes first information related to a PPDU type, second information related to an identifier of a basic service set (BSS), third information indicating duration information related to a transmission opportunity (TXOP), fourth information related to whether the PPDU is sent in uplink (UL) or in downlink (DL), fifth information related to a bandwidth, and sixth information having a length of 3 bits and indicating a physical (PHY) version of the PPDU; and
receiving, by the STA, a second PPDU including a second management frame, wherein the second management frame includes information for terminating the duration.

6. The method of claim 5, wherein the low latency data includes data requiring a time latency value less than or equal to a threshold value.

7. The method of claim 5, wherein the low latency data is received, based on channel contention, within the duration for the low latency communication, wherein the low latency data includes data requiring a time latency value less than or equal to a threshold value.

8. The method of claim 5, wherein the duration is configured in at least one link among a plurality of links.

9. A station (STA), comprising:
at least one processor; and
at least one computer memory operatively connected to the at least one processor and storing instructions that, based on being executed by the at least one processor, perform operations comprising:
transmitting, by a station (STA), a first Physical Protocol Data Unit (PPDU) including a first management frame, wherein the first management frame includes information related to a duration for low latency communication;
transmitting, by the STA, a trigger frame soliciting a trigger based (TB) PPDU with the duration;
receiving, by the STA, the TB PPDU including low latency data based on the trigger frame, wherein the TB PPDU includes a legacy signal (L-SIG) field, a repeated L-SIG (RL-SIG) field being contiguous to the L-SIG field, and a first signal field being contiguous to the RL-SIG field,
wherein the L-SIG field includes a length field, and a value of the length field is set to satisfy a condition that a remainder is zero (0) when the value of the length field is divided by three (3),
wherein the first SIG field includes first information related to a PPDU type, second information related to an identifier of a basic service set (BSS), third information indicating duration information related to a transmission opportunity (TXOP), fourth information related to whether the PPDU is sent in uplink (UL) or in downlink (DL), fifth information related to a bandwidth, and sixth information having a length of 3 bits and indicating a physical (PHY) version of the PPDU; and
transmitting, by the STA, a second PPDU including a second management frame, wherein the second management frame includes information for terminating the duration.

10. The STA of claim 9, wherein the low latency data includes data requiring a time latency value less than or equal to a threshold value.

11. The STA of claim 9, wherein the low latency data is received, based on channel contention, within the duration for the low latency communication, wherein the low latency data includes data requiring a time latency value less than or equal to a threshold value.

12. The STA of claim 9, wherein the duration is configured in at least one link among a plurality of links.

* * * * *